United States Patent
Woolsey et al.

(10) Patent No.: US 12,192,308 B2
(45) Date of Patent: *Jan. 7, 2025

(54) INTERCEPTOR HUB FOR SERVICE-CONSUMING APPLICATIONS

(71) Applicant: UNITED STATES POSTAL SERVICE, Washington, DC (US)

(72) Inventors: Tyler J. Woolsey, Ramsey, MN (US); Tyler M. O'Gara, Rogers, MN (US); Craig Alan Cole, Farmington, MN (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,483

(22) Filed: Sep. 8, 2023

(65) Prior Publication Data

US 2023/0421666 A1 Dec. 28, 2023

Related U.S. Application Data

(63) Continuation-in-part of application No. 17/750,759, filed on May 23, 2022, now Pat. No. 11,943,322, (Continued)

(51) Int. Cl.
*H04L 67/63* (2022.01)
*G06F 9/54* (2006.01)
(Continued)

(52) U.S. Cl.
CPC .............. *H04L 67/63* (2022.05); *G06F 9/547* (2013.01); *H04L 67/133* (2022.05); *H04L 67/51* (2022.05)

(58) Field of Classification Search
CPC ....... G06F 9/547; H04L 67/133; H04L 67/51; H04L 67/63
(Continued)

(56) References Cited

U.S. PATENT DOCUMENTS

| 7,933,290 B2 | 4/2011 | Aholainen |
| 9,998,564 B1 | 6/2018 | Kaukl et al. |

(Continued)

OTHER PUBLICATIONS

Lee, Sun Hwa (Authorized Officer), International Preliminary Report on Patentability issued in International Application No. PCT/US2022/030495 mailed on Jan. 25, 2024, 5 pages.

(Continued)

*Primary Examiner* — Wing F Chan
*Assistant Examiner* — Leon Y Tseng
(74) *Attorney, Agent, or Firm* — MH2 Technology Law Group, LLP

(57) ABSTRACT

A method, a system, and a non-transitory computer-readable medium are provided. An interceptor hub application (IHA) receives a request for services in a first format and converts at least some information in the request to a second format. Respective requests are sent to the requested services, at least some which include a corresponding portion of the information in the second format. The IHA receives respective service responses from the respective services and provides the respective service responses in an expected combined service response format. A first request for permission to access an application program interface/endpoint is received from a user of a client via an IHA user interface and is provided to a first manager of the application program interface/endpoint. Approval of the first request from the first manager is received, and in response, the interceptor hub application provides the client with access to the application program interface/endpoint.

20 Claims, 17 Drawing Sheets

Related U.S. Application Data which is a continuation of application No. 17/372,684, filed on Jul. 12, 2021, now Pat. No. 11,349,956.

(51) Int. Cl.
*H04L 67/133* (2022.01)
*H04L 67/51* (2022.01)

(58) Field of Classification Search
USPC ......................................... 709/219
See application file for complete search history.

(56) References Cited

U.S. PATENT DOCUMENTS

| | | |
|---|---|---|
| 11,349,956 B1 | 5/2022 | Cole |
| 2002/0032783 A1* | 3/2002 | Tuatini .................. H04L 67/288 |
| | | 709/225 |
| 2004/0167960 A1 | 8/2004 | Kinner et al. |
| 2009/0235325 A1 | 9/2009 | Dimitrakos et al. |
| 2010/0329269 A1 | 12/2010 | Selitser et al. |
| 2014/0181267 A1 | 6/2014 | Wadkins et al. |
| 2014/0372509 A1 | 12/2014 | Fausak et al. |
| 2018/0084392 A1 | 3/2018 | Razfar et al. |
| 2023/0015785 A1 | 1/2023 | Cole |

OTHER PUBLICATIONS

Office Action issued in U.S. Appl. No. 17/750,759 on Aug. 15, 2023, 21 pages.

International Search Report and Written Opinion issued in corresponding International Patent Application No. PCT/US2022/030495 dated Aug. 19, 2022, 6 pages.

Notice of Allowance issued in U.S. Appl. No. 17/372,684 on Feb. 4, 2022, 9 pages.

* cited by examiner

INTERCEPTOR HUB FOR SERVICE-CONSUMING APPLICATIONS

CROSS-REFERENCE TO RELATED APPLICATIONS

This application is a continuation-in-part application of U.S. Utility patent application Ser. No. 17/750,759, entitled "Interceptor Hub for Service-Consuming Applications," filed May 23, 2022, which is a continuation application of U.S. Utility patent application Ser. No. 17/372,684, entitled "Interceptor Hub for Service-Consuming Applications," filed Jul. 12, 2021, and issued as U.S. Utility Pat. No. 11,349,956 on May 31, 2022. U.S. Utility patent application Ser. No. 17/750,759 and U.S. Utility Pat. No. 11,349,956 are hereby incorporated by reference in their entirety.

BACKGROUND

When a service executing on a computing device changes, resulting in a change to an application program interface (API) of the service, service-consuming applications that call the service generally should be modified in order to remain compatible with the service. A failure to modify a service-consuming application that calls the service will cause the unmodified service-consuming application(s) to function in unexpected ways or not at all when calling the service.

Similarly, when an existing service is to be called from service-consuming applications that use protocols different from those used by the existing service, changes should be made to the service-consuming applications to be able to use the existing service.

Further, when a client requests a change to a system with service-consuming applications, wherein the change includes, but is not limited to, requesting access to an API/endpoint, or requesting creation of a new client, the client makes the request via email and a development team creates and deploys a script in a customer acceptance testing environment and in a production environment. A more efficient and less error prone way to request and make a change is desired.

SUMMARY

In a first aspect of various embodiments, a method provides a user interface for an interceptor hub application. According to the method, the interceptor hub application executing on a first computing device receives, via a network, a request for services from a first service-consuming application executing on a second computing device. The request is in a first format for an interceptor interface. The services execute on at least one other computing device and are accessible via the first computing device through the network. The interceptor hub application converts at least some information in the received request to a second format of a corresponding interface of at least one of the requested services and sends a respective request to each of the requested services executing on a corresponding one of the at least one other computing device. At least some of the respective requests include a corresponding portion of the information in the second format. The interceptor hub application receives a respective service response from the each of the respective services and provides each of the respective service responses in a combined service response to the first service-consuming application in a corresponding response format expected by the first service-consuming application.

A first request for permission to access a first application program interface/endpoint is received from a user of a client via the user interface. The interceptor hub application provides the first request to a first manager of the first application program interface/endpoint. The interceptor hub application receives approval of the first request from the first manager responsive to the providing of the first request to the first manager. The interceptor hub application then provides the client with access to the first application program interface/endpoint responsive to the receiving of the approval of the first request.

In a first variation of the first aspect, a request for a new client is received via the user interface. The new client is created in response to the receiving of the request for the new client.

In a second variation of the first aspect, a second request is provided from the new client via the user interface of the interceptor hub application to an authenticator to access a second application program interface/endpoint. The interceptor hub application receives from the authenticator the second request with an access token upon successful authentication by the authenticator of the new client to access the second application program interface/endpoint. The interceptor hub application authenticates the new client to access the second application program interface/endpoint responsive to the receiving of the second request with the access token of the new client from the authenticator. The interceptor hub application provides the new client with access to the second application program interface/endpoint responsive to the authenticating by the interceptor hub application.

In a third variation of the first aspect, the interceptor hub application provides an application program interface owner service to determine who owns an application program interface, wherein the application program interface owner service provides an owner of the application program interface an ability to manage the application program interface.

In a fourth variation of the first aspect, a user management service is provided to manage access by a user within the user interface. A user service is provided to provide authorizations and permissions of the user within the user interface.

In a fifth variation of the first aspect, multiple components of the user interface for a user are controlled based on a role assigned to the user from among multiple roles. The multiple roles include: an interceptor hub system admin role; application program interface roles, and event stream processing roles, wherein the application program interface roles and the event stream processing roles each include a respective admin role, a respective manager role, and a respective user role.

In a sixth variation of the first aspect, a first user assigned to the interceptor hub system admin role can control inner workings of the interceptor hub application and can perform anything that a user assigned to any other role can do, a second user assigned to an application program interface admin role of the application program interface roles can register, modify, and delete application program interface/endpoints, clients, and sources owned by the second user, a third user assigned to an application program interface manager role of the application program interface roles can approve access requests to any application program interfaces owned by the third user, and can approve application program interface user profile requests, a fourth user assigned to an application program interface user role can view a catalog of available application program interfaces and can request access to application program interfaces for clients and sources to which the fourth user has access, a fifth user assigned to an application program interface read only user role of the application program interface roles can only view the catalog of available application program interfaces, a sixth user assigned to an event stream processing admin role of the event streaming and processing management roles can register, modify, and delete logs of events and clients owned by the sixth user, and can perform anything that a user assigned to an event stream processing user role can do, a seventh user assigned to an event stream processing manager role of the event stream processing roles can approve access requests to logs of events owned by the seventh user, an eighth user assigned to an event stream processing user role of the event stream processing roles can view a catalog of available logs of events, and can request access to logs of events for clients to which the eighth user has access, and a ninth user assigned to an event stream processing read only role of the event stream processing roles can only view the catalog of the available logs of events.

In a second aspect of the various embodiments, a system provides a user interface for an interceptor hub application. The system includes at least one processor, at least one memory, and a bus connecting the at least one processor with the at least one memory and is configured to perform a number of operations. According to the operations, the interceptor hub application is executed. The interceptor hub application executing on a first computing device included in the system receives via a network, a request for services from a first service-consuming application executing on a second computing device. The services execute on at least one other computing device and are accessible via the first computing device through the network. The request is in a first format for an interceptor interface. The interceptor hub application converts at least some information in the received request to a second format of a corresponding interface of at least one of the requested services and sends a respective request to the each of the requested services executing on a corresponding one of the at least one other computing device, wherein at least some of the respective requests include a corresponding portion of the information in the second format. The interceptor hub application receives a respective service response from the each of the respective services and provides each of the respective service responses in a combined service response to the first service-consuming application in a corresponding response format expected by the first service-consuming application. The user interface of the interceptor hub application receives a first request from a user of a client for permission to access a first application program interface/endpoint. The interceptor hub application provides the first request to a first manager of the first application program interface/endpoint. Approval of the first request from the first manager is received by the interceptor hub application responsive to the providing of the first request to the first manager. The client is provided, by the interceptor hub application, with access to the first application program interface/endpoint responsive to the receiving of the approval of the first request.

In a first variation of the second aspect, the system is further configured to receive, via the user interface, a first request for a new client and create the new client responsive to the receiving of the first request for the new client.

In a second variation of the second aspect, the system is further configured to provide, from the new client via the user interface of the interceptor hub application to an authenticator, a second request to access a second application program interface/endpoint. The interceptor hub application receives, from the authenticator, the second request with an access token upon successful authentication by the authenticator of the new client to access the second application program interface/endpoint. The interceptor hub application authenticates the new client to access the second application program interface/endpoint responsive to the receiving of the second request with the access token from the authenticator. The interceptor hub application provides the new client with access to the second application program interface/endpoint responsive to the authenticating by the interceptor hub application.

In a third variation of the second aspect, the system is further configured to provide, by the interceptor hub application, an application program interface owner service to determine who owns an application program interface, wherein the application program interface owner service provides an owner of the application program interface an ability to manage the application program interface.

In a fourth variation of the second aspect, the system is further configured to provide a user management service to manage access by a user within the user interface. A user service is provided to provide authorizations and permissions of the user within the user interface. A real-time event stream processing user interface component is provided to allow respective users to manage logs of events that the respective users own.

In a fifth variation of the second aspect, multiple components of the user interface for a user are controlled based on a role assigned to the user from among the multiple roles. The multiple roles include: an interceptor hub system admin role; application program interface roles, and event stream processing roles. The application program interface roles and the event stream processing roles each include a respective admin role, a respective manager role, and a respective user role.

In a sixth variation of the second aspect, a first user assigned to the interceptor hub system admin role can control inner workings of the interceptor hub application and can perform anything that a user assigned to any other role can do, a second user assigned to an application program interface admin role of the application program interface roles can register, modify, and delete application program interface/endpoints, clients, and sources owned by the second user, a third user assigned to an application program interface manager role of the application program interface roles can approve access requests to any application program interfaces owned by the third user, and can approve application program interface user profile requests, a fourth user assigned to an application program interface user role can view a catalog of available application program interfaces and can request access to application program interfaces for clients and sources to which the fourth user has access, a fifth user assigned to an application program interface read only user role of the application program interface roles can only view the catalog of available application program interfaces, a sixth user assigned to an event stream processing admin role of the event streaming and processing roles can register, modify, and delete logs of events and clients owned by the sixth user, and can perform anything that a user assigned to an event stream processing user role can do, a seventh user assigned to an event stream processing manager role of the event streaming and processing roles can approve access requests to logs of events owned by the seventh user, an eighth user assigned to an event stream processing user role of the event streaming and processing roles can view a catalog of available logs of events, and can request access to logs of events for clients to which the eighth user has access, and a ninth user assigned to an event stream processing read only role of the event streaming and processing roles can only view the catalog of the available logs of events.

In a third aspect of the various embodiments, a non-transitory computer-readable medium having instructions recorded thereon is provided. When the instructions are executed by a processor of a first computing device, the first computing device is configured to perform operations. According to the operations, an interceptor hub application executing on a first computing device receives, via a network, a request for services from a first service-consuming application executing on a second computing device. The services execute on at least one other computing device and are accessible via the first computing device through the network. The request is in a first format for an interceptor interface. The interceptor hub application converts at least some information in the received request to a second format of a corresponding interface of at least one of the requested services and sends a respective request to the each of the requested services executing on a corresponding one of the at least one other computing device, wherein at least some of the respective requests include a corresponding portion of the information in the second format. The interceptor hub application receives a respective service response from the each of the respective services and provides each of the respective service responses in a combined service response to the first service-consuming application in a corresponding response format expected by the first service-consuming application. A first request from a user of a client for permission to access a first application program interface/endpoint is received via a user interface of the interceptor hub application. The interceptor hub application provides the first request to a first manager of the first application program interface/endpoint. The interceptor hub application receives approval of the first request from the first manager responsive to the providing of the first request to the first manager. The interceptor hub application provides the client with access to the first application program interface/endpoint responsive to the receiving of the approval of the first request.

In a first variation of the third aspect, the operations further include receiving, via the user interface, a first request for a new client, and the new client is created in response to the receiving of the first request for the new client.

In a second variation of the third aspect, the operations further include providing, from the new client via the user interface of the interceptor hub application to an authenticator, a second request to access a second application program interface/endpoint. The interceptor hub application further receives, from the authenticator, the second request with an access token upon successful authentication by the authenticator of the new client to access the second application program interface/endpoint. The interceptor hub application authenticates the new client to access the second application program interface/endpoint responsive to the receiving of the second request with the access token from the authenticator. The interceptor hub application provides the new client with access to the second application program interface/endpoint responsive to the authenticating by the interceptor hub application.

In a third variation of the third aspect, the operations further include providing, by the interceptor hub application, an application program interface owner service to determine who owns an application program interface. The application program interface owner service provides an owner of the application program interface an ability to manage the application program interface.

In a fourth variation of the third aspect, the operations include providing a user management service to manage access by a user within the user interface. A user service provides authorizations and permissions of the user within the user interface.

In a fifth variation of the third aspect, the operations further include controlling multiple components of the user interface for a user based on a role assigned to the user from among multiple roles. The multiple roles include: an interceptor hub system admin role; application program interface roles, and event streaming and processing roles. The application program interface roles and the event streaming and processing roles each include a respective admin role, a respective manager role, and a respective user role.

DESCRIPTION OF THE DRAWINGS

The accompanying drawings, which are incorporated in and constitute a part of this specification, illustrate embodiments of the present teachings and together with the description, serve to explain the principles of the present teachings. In the drawings.

DETAILED DESCRIPTION

Throughout this specification, the terms "interceptor hub application" and "interceptor hub" are defined as an interceptor hub application executing on a computing device. The terms may be used interchangeably. In addition, the term "service" is defined as an all-encompassing body of API/Endpoints. The term "API/Endpoint" refers to an endpoint of a specific API. Note that in various embodiments, a client cannot request access to an API, but instead requests access to an endpoint within an API.

Reference will now be made in detail to the present examples of embodiments of the disclosure, several examples of which are illustrated in the accompanying drawings.

Figure 1:
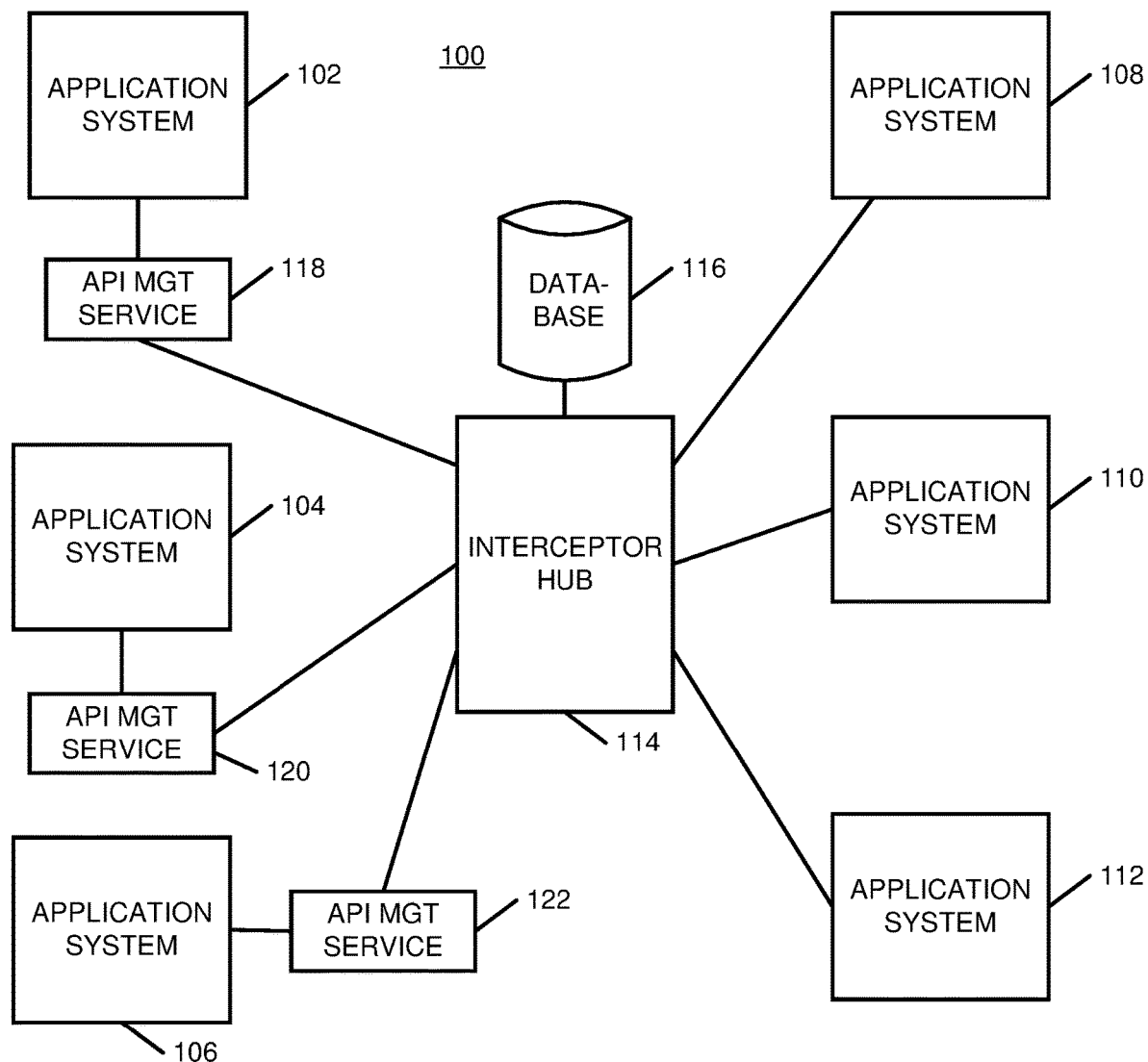
FIG. 1 illustrates an example environment in which embodiments may operate.

FIG. 1 illustrates an example environment 100 in which various embodiments may be implemented. Application systems 102, 104, 106, 108, 110, 112 may include one or more service-consuming applications and/or one or more service-providing applications (i.e., services).

In some embodiments, some application systems such as, for example, application systems 102, 104, 106 may connect to an interceptor hub 114 via API management services 118, 120, 122, respectively. Other application systems such as, for example, application systems 108, 110, 112 may connect to interceptor hub 114 via the network without using API management services.

Interceptor hub 114 may include a computing device that intercepts a call to a service from a service-consuming application and accesses a database 116 to determine whether the service-consuming application is authorized to use the service, an address of an application system on which the service resides, characteristics of a first API and a first protocol used by the service consuming application to call the service, and characteristics of a second API and a second protocol used by the service to return a service response to interceptor hub 114. Interceptor hub 114 may receive the call from the service-consuming application via the first API and the first protocol, may perform any required data conversions, and forward the call to the requested service using the second API and the second protocol. The requested service may generate a service response and provide the service response to interceptor hub 114 via the second API and the second protocol. Interceptor hub 114 may perform any required data conversions and may forward the service response to the service-consuming application via the first API and the first protocol.

In embodiments in which service-consuming applications executing on at least some application systems communicate with interceptor hub 114 via a corresponding API management service, the service-consuming applications or users may log into a corresponding application executing on the corresponding API management service before any calls are made from the service-consuming applications to services via interceptor hub 114. The corresponding API management services may authenticate the service-consuming applications or the users before accepting service calls from the service-consuming applications. In some embodiments, the API management services may include a DataPower® appliance (DataPower is a registered trademark of International Business Machines Corporation of Armonk, NY). The DataPower® appliance may provide security services such as, for example, authentication of service-consuming applications or users.

In embodiments in which service-consuming applications do not communicate with corresponding API management services, authentication services may be provided by, for example, interceptor hub 114 or other servers within the network.

Figure 2:
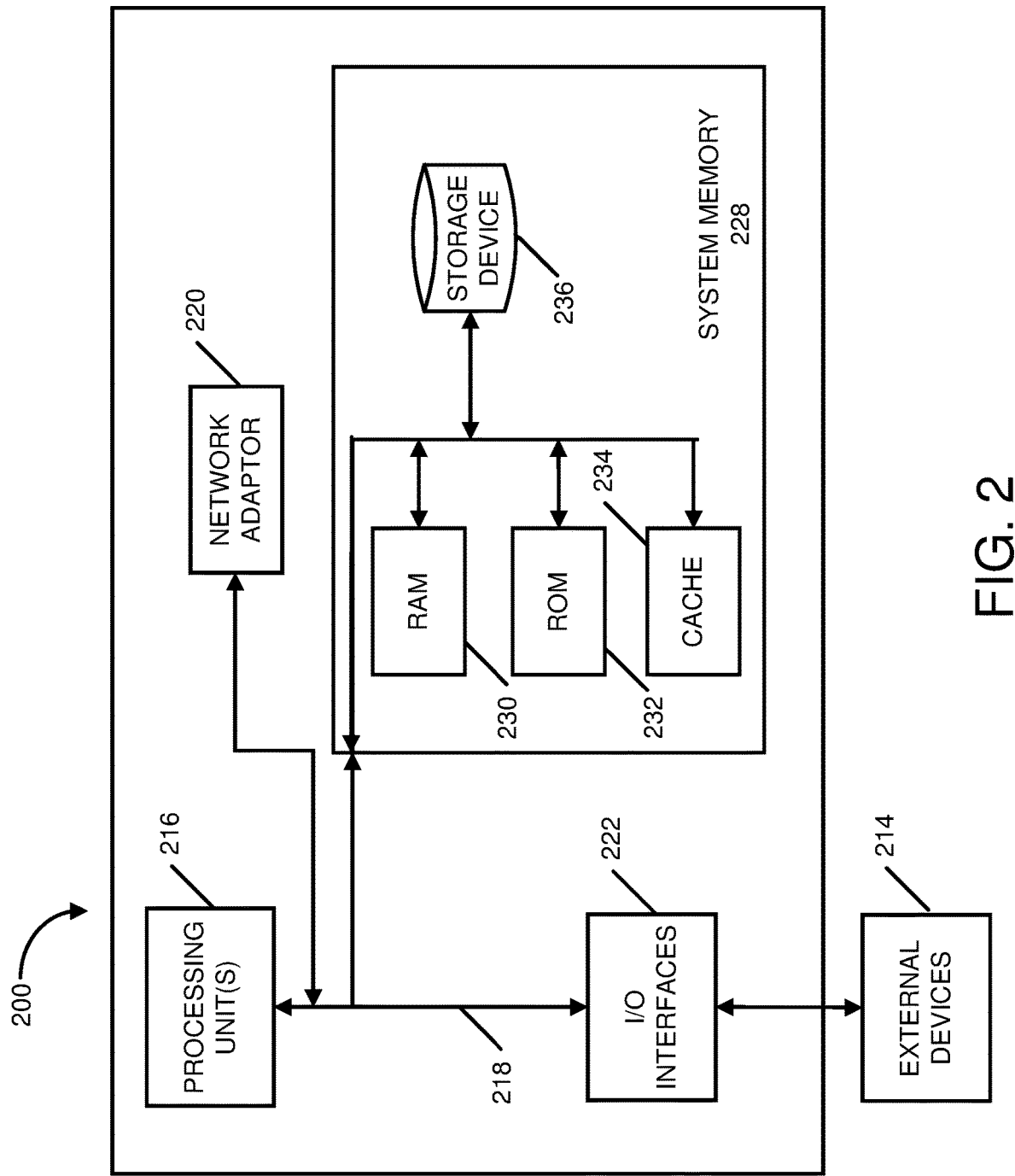
FIG. 2 is a functional block diagram of a computing system that may implement any of an interceptor hub, an application system, and an application management service.

FIG. 2 illustrates an example computing system 200 that may implement any of application systems 102-112, API management services 118-122, and interceptor hub 114.

Computing system 200 is shown in a form of a general-purpose computing device.

Components of computing system 200 may include, but are not limited to, one or more processing units 216, a system memory 228, and a bus 218 that couples various system components including system memory 228 to one or more processing units 216.

Bus 218 represents any one or more of several bus structure types, including a memory bus or memory controller, a peripheral bus, an accelerated graphics port, and a processor or local bus using any of a variety of bus architectures. Such architectures may include, but not be limited to, Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 may include various non-transitory computer system readable media, which may be any available non-transitory media accessible by computing system 200. The computer system readable media may include volatile and non-volatile non-transitory media as well as removable and non-removable non-transitory media.

System memory 228 may include non-transitory volatile memory, such as random access memory (RAM) 230 and cache memory 234. System memory 228 also may include non-transitory non-volatile memory including, but not limited to, read-only memory (ROM) 232 and storage system 236. Storage system 236 may be provided for reading from and writing to a nonremovable, non-volatile magnetic medium, which may include a hard drive or a Secure Digital (SD) card. In addition, a magnetic disk drive, not shown, may be provided for reading from and writing to a removable, non-volatile magnetic disk such as, for example, a floppy disk, and an optical disk drive for reading from or writing to a removable non-volatile optical disk such as a CD-ROM, DVD-ROM or other optical media. Each memory device may be connected to bus 218 by at least one data media interface. System memory 228 further may include instructions for processing unit(s) 216 to configure computing system 200 to perform functions of embodiments of the invention. For example, system memory 228 also may include, but not be limited to, processor instructions for an operating system, at least one application program, other program modules, program data, and an implementation of a networking environment.

Computing system 200 may communicate with one or more external devices 214 including, but not limited to, one or more displays, a keyboard, a pointing device, a speaker, at least one device that enables a user to interact with computing system 200, and any devices including, but not limited to, a network card, a modem, etc., that enable computing system 200 to communicate with one or more other computing devices. The communication can occur via Input/Output (I/O) interfaces 222. Computing system 200 can communicate with one or more networks including, but not limited to, a local area network (LAN), a general wide area network (WAN), a packet-switched data network (PSDN) and/or a public network such as, for example, the Internet, via network adapter 220. As depicted, network adapter 220 communicates with the other components of computer system 200 via bus 218.

It should be understood that, although not shown, other hardware and/or software components could be used in conjunction with computer system 200. Examples, include, but are not limited to, microcode, device drivers, redundant processing units, external disk drive arrays, RAID systems, tape drives, and data archival storage systems, etc.

Figure 3:
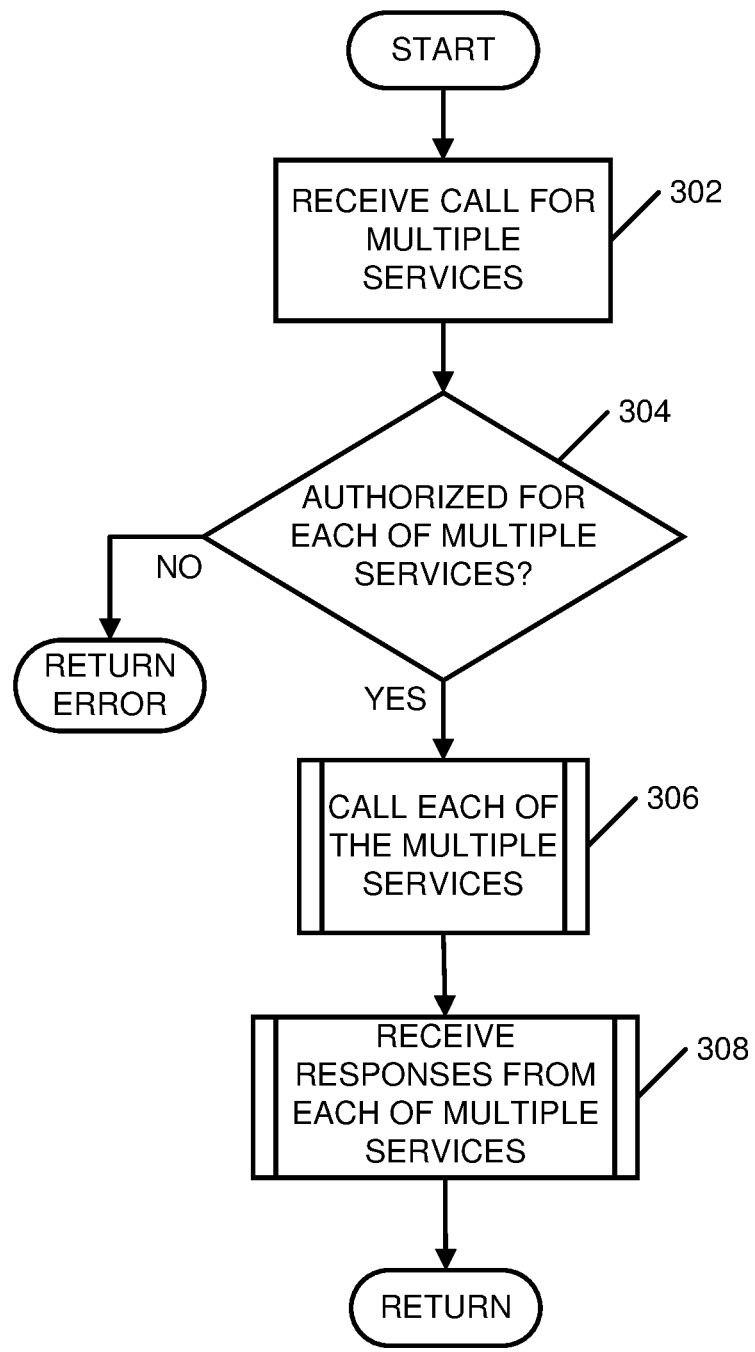
FIG. 3 is a flowchart of an example process that may be performed by an interceptor hub application when a combined call for multiple services is received.
Figure 4:
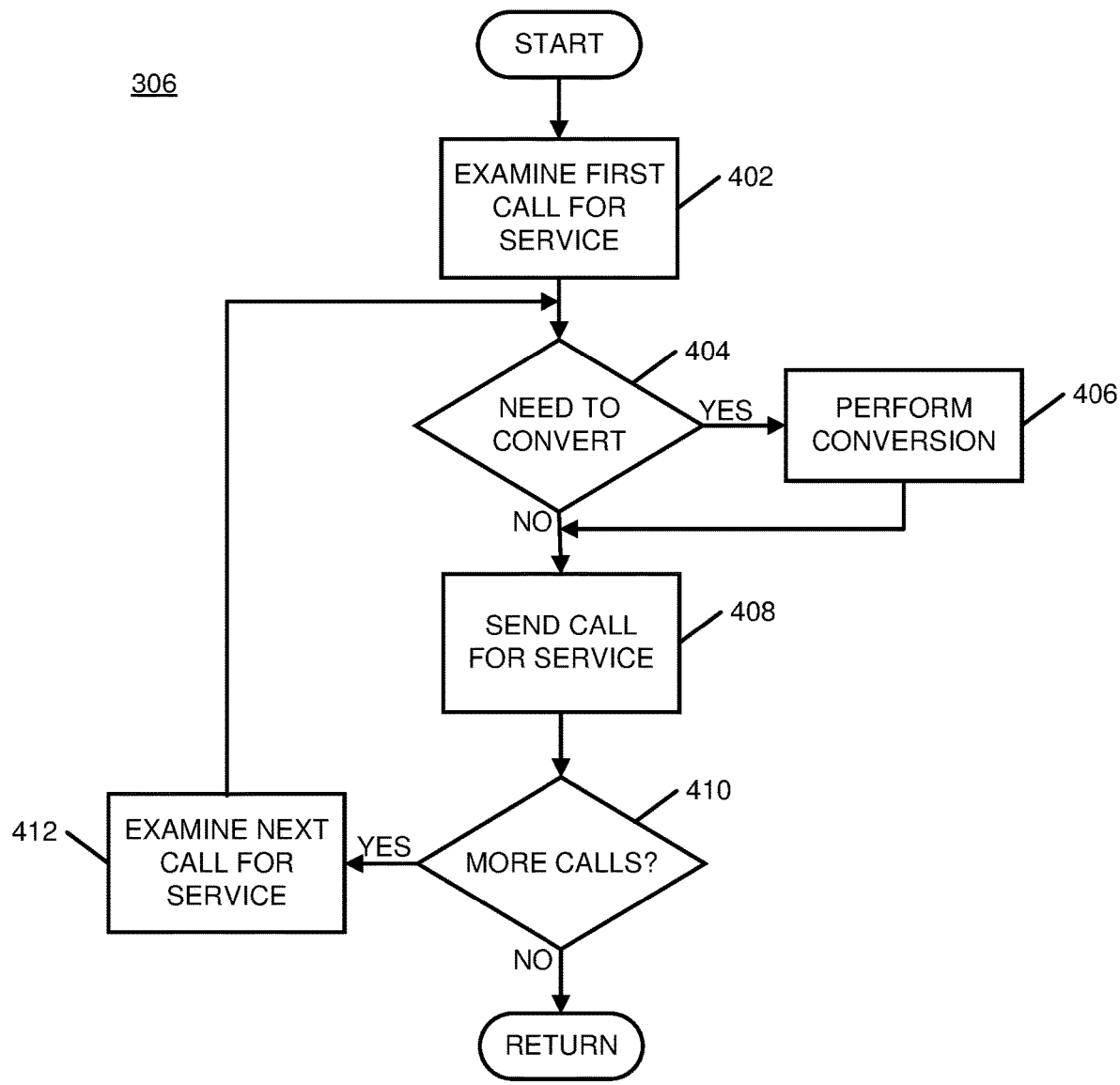
FIG. 4 is a flowchart illustrating an example process that may be performed by an interceptor hub application to process the combined call for services and send respective calls for each of the services.
Figure 5:
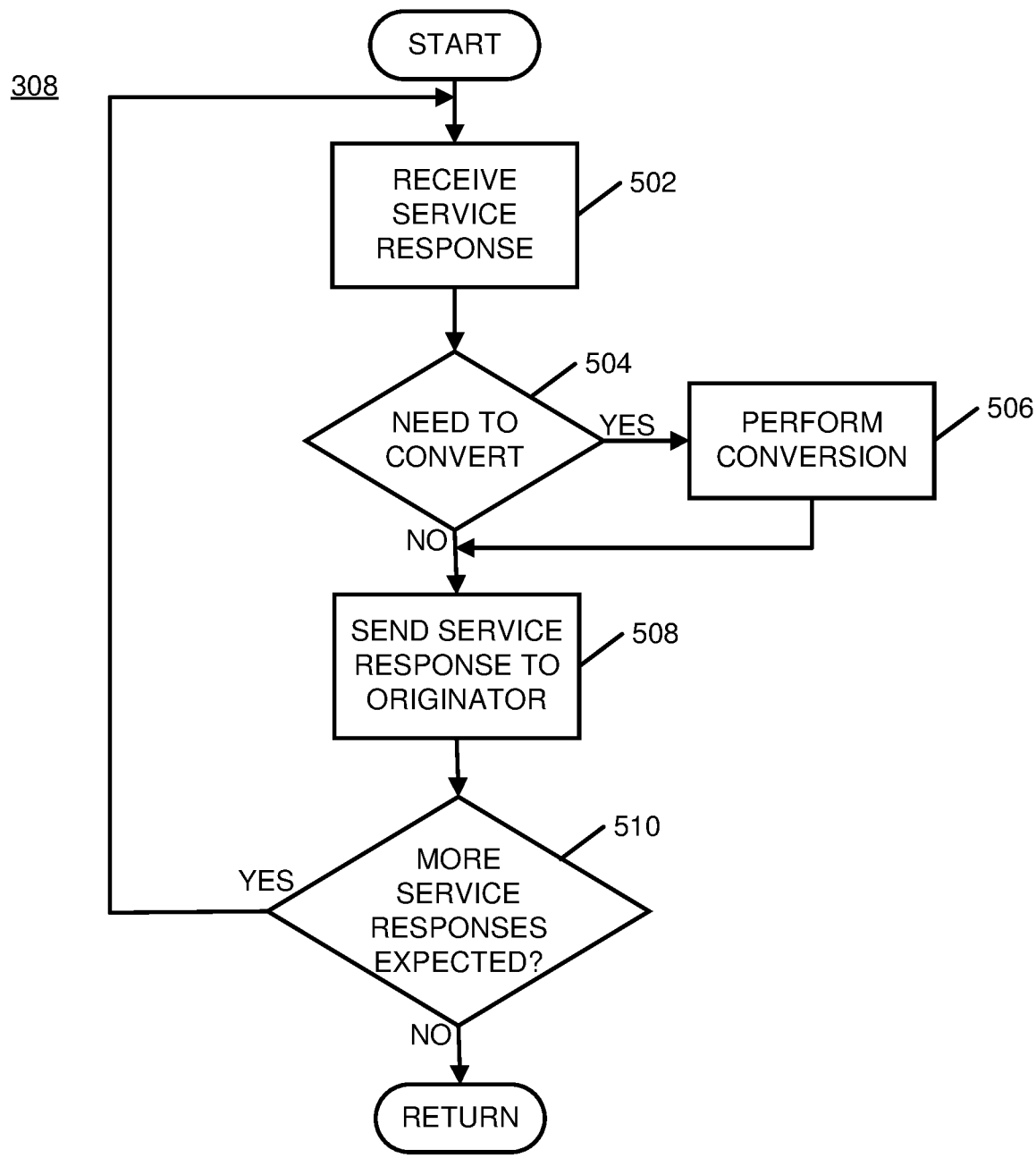
FIG. 5 is a flowchart of an example process that may be performed by an interceptor hub application to process received service responses in response to sending of multiple service requests corresponding to service requests in a received combined call for services.

In some embodiments, a service-consuming application executing on an application system may send a request to interceptor hub 114, which may be an interceptor hub application executing on a computing device, for one or more services. In this example, the service-consuming application sends a single request that includes calls for multiple services. FIGS. 3-5 are flowcharts that illustrate an example process that may be performed by interceptor hub 114 in various embodiments when a request including calls for multiple services is received by interceptor hub 114. The process may begin with interceptor hub 114 receiving a single request for multiple services from a service-consuming application executing on an application system (act 302). Interceptor hub 114 may receive the request via an API between the service-consuming application and interceptor hub 114, and if needed, may perform a data conversion to convert data included in the request to a format understood by interceptor hub 114.

In some embodiments, interceptor hub 114 may access database 116 to determine whether the service-consuming application is authorized to call each of the multiple services (act 304). If interceptor hub 114 determines that the service-consuming application is not authorized to request, or call, each of the multiple services, then an error code or message may be provided to the service-consuming application. Otherwise, if interceptor hub 114 determines that the service-consuming application is authorized to request, or call, each of the multiple services, then interceptor hub 114 may call each of the multiple services at a corresponding address that each of the service-consuming applications is authorized to call, as indicated in, for example, database 116 (act 306).

Responsive to calling each of the multiple services, interceptor hub 114 may receive service responses from each of the multiple services (act 308) and may provide the responses to the service-consuming application.

FIG. 4 is a flowchart illustrating act 306 in more detail. The process may begin with interceptor hub 114 examining a first call for service (act 402). Interceptor hub 114 then may determine whether any data in the call for service needs to be converted to a different format or protocol (act 404). For example, a service caller, or requester, may want a service response to be in a particular format such as JSON, XML, or another format that may have delimited values, fixed length fixed position, or even a partial payload. As an example, a data set {a,bc,def} may be requested as comma-separated values (as shown) or may be separated by another delimiter {a/bc/def}. The service response may be requested in a fixed length format such as, for example, (a^^^^bc^^^def^), where ^ represents a space character and each field may have a length of five characters as shown, or another length. A request may be made for a generic provided service to provide a partial payload that is relevant to a requesting application. For example, if only fields 1 and 2 are relevant to an application, application1, then interceptor hub 114 may return only (a,bc) to application1 instead of a complete payload.

If any of the data in the call for service needs to be converted to a different format or to a different protocol, then interceptor hub 114 may perform the conversion (act 406). Interceptor hub 114 then may send the call for the service to an application system on which the service is executing, as indicated by database 116 (act 408).

Interceptor hub 114 then may determine whether there are any additional calls for services (act 410). If there are no additional calls for services, then the process may be completed. Otherwise, a next call for a service may be examined by interceptor hub 114 (act 412) and acts 404-410 again may be performed.

FIG. 5 is a flowchart that illustrates example processing of act 308 in more detail. The process may begin with interceptor hub 114 receiving a service response from a service executing on an application system (act 502). The service response is provided via a protocol and is in a format that interceptor hub 114 expects from the service. Interceptor hub then may determine whether the service response needs to be converted to a protocol and a format that an originating service-consuming application expects (act 504). If a conversion is needed to convert the format of the service response or change the protocol for the service response, then interceptor hub 114 may perform the conversion (act 506) and may then provide the service response to the originating service-consuming application (act 508). Interceptor hub 114 then may determine whether any more service responses are expected (act 510). If more service responses are expected, interceptor hub 114 may wait for and process a next received service response (act 502).

In an alternative embodiment, instead of separately providing each service response to the originating service-consuming application, interceptor hub 114 may buffer each of the received service responses corresponding to each of the calls for service included in the call for services received from the originating service-consuming application during act 302. Once all of the service responses have been received from the multiple services and buffered, interceptor hub 114 may combine the service responses into a single combined service response that is sent to the originating service-consuming application. Thus, for example, if a service provides employee name, scheduled start time, and last clocked action given for a request, the original service-consuming application may receive a response for a single employee or may request and receive a combined response for multiple employees. If the combined response is requested, interceptor hub 114 would recognize the request for the combined response as a batch type request and would submit individual requests to the service. Interceptor hub 114 then would consolidate individual responses from the service and send the consolidated individual responses back to the originating service-consuming application in aggregate.

Figure 6:
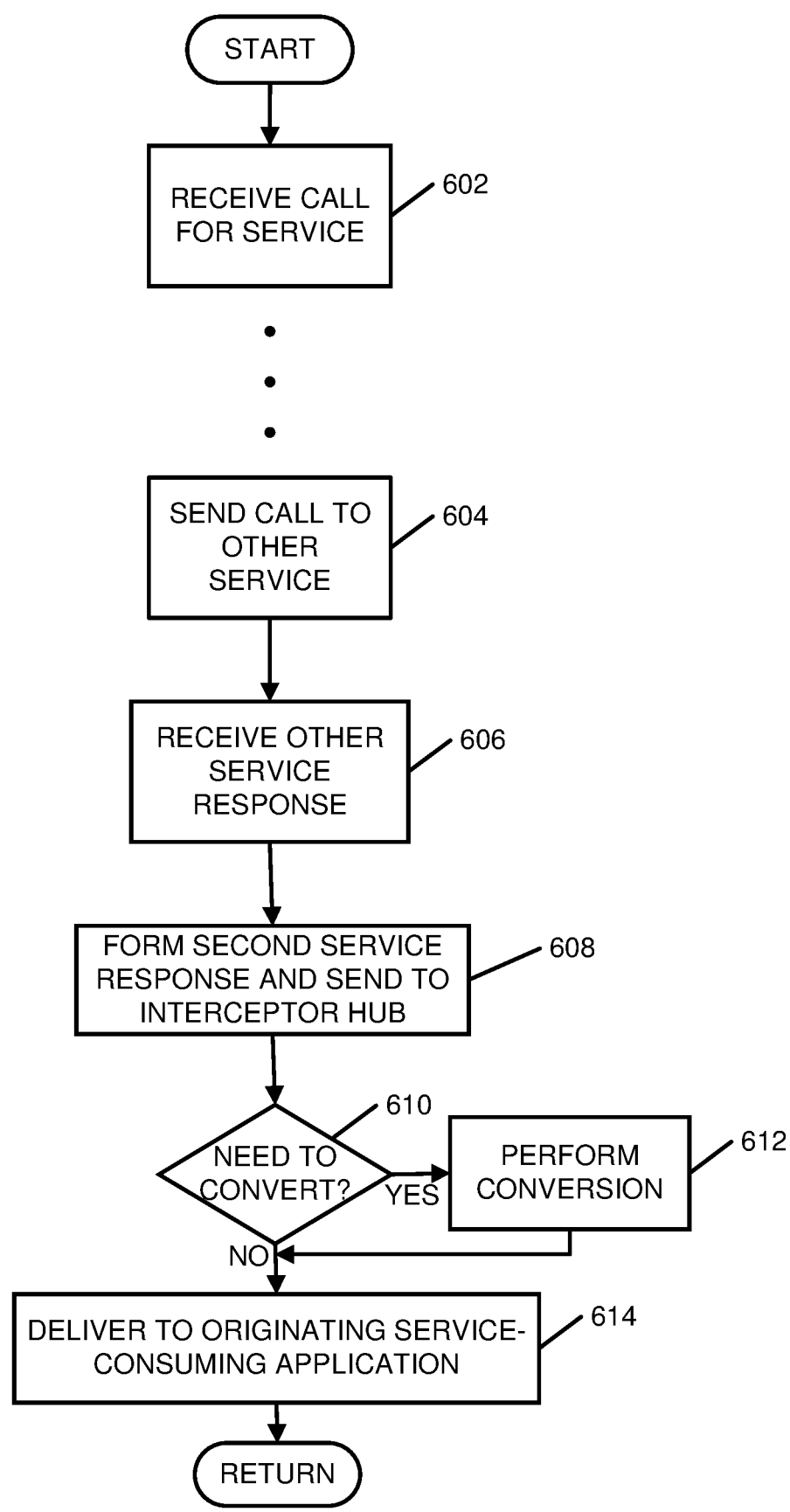
FIG. 6 shows example processing for a service that sends a call to and receives a response from another service.

In some embodiments, a service called by a service-consuming application may call another service executing on a same or other application system. FIG. 6 illustrates example processing with respect to a service that calls another service. The process may start with an application system or other computing system such as, for example, a computing system that executes an interceptor application as well as the service-consuming application, receiving a call for the service from the service-consuming application via the interceptor application (act 602). If the service is executing on a same computing system as the interceptor hub application, the call for the service from the service-consuming application may be received by the service via a second interceptor hub application executing on a second computing system. In this example, the call for the service is processed by the service, which sends a call for a different service while performing processing related to the service (act 604). The call for the different service may be received by the interceptor hub application executing in the same computing system as the service or by a different interceptor hub application executing on another computing system, depending on a configuration for the service. The interceptor hub application receiving the call for the different service may determine whether the calling application is authorized to call the different service, and if the application is authorized, may perform a conversion, as previously discussed, and may send the call to the different service at a network address indicated by a database such as, for example, database 116.

The service may receive a service response from the different service (act 606) via an interceptor hub application that provided the call to the different service. After receiving the service response from the different service, the service may form a second service response and may send the second service response to the interceptor hub application that provided the call to the service (act 608). The interceptor hub application that receives the service response from the service, may perform any required conversions (acts 610-612), and may deliver the service response to the originating service-consuming application (act 614).

In some embodiments, a service consuming application and/or interceptor hub 114 (i.e. interceptor hub application) may use representational state transfer (REST) to access Web services. A RESTful web service provides an application access to web resources in a textual representation. Reading and modification of web resources of a RESTful web service is performed by using a stateless protocol and a predefined operation set. Via a RESTful web service, a request to a resource's uniform resource indicator (URI) may produce a response formatted in Hypertext Markup Language (HTML), eXtended Markup Language (XML), Javascript Object Notation (JSON), or another format. Hypertext Transfer Protocol (HTTP) is commonly used and available HTTP methods include GET, HEAD, POST, PUT, PATCH, DELETE, CONNECT, OPTIONS and TRACE, but other protocols (e.g., HTTPS) may be implemented without departing from the scope of the present disclosure.

Figure 7:
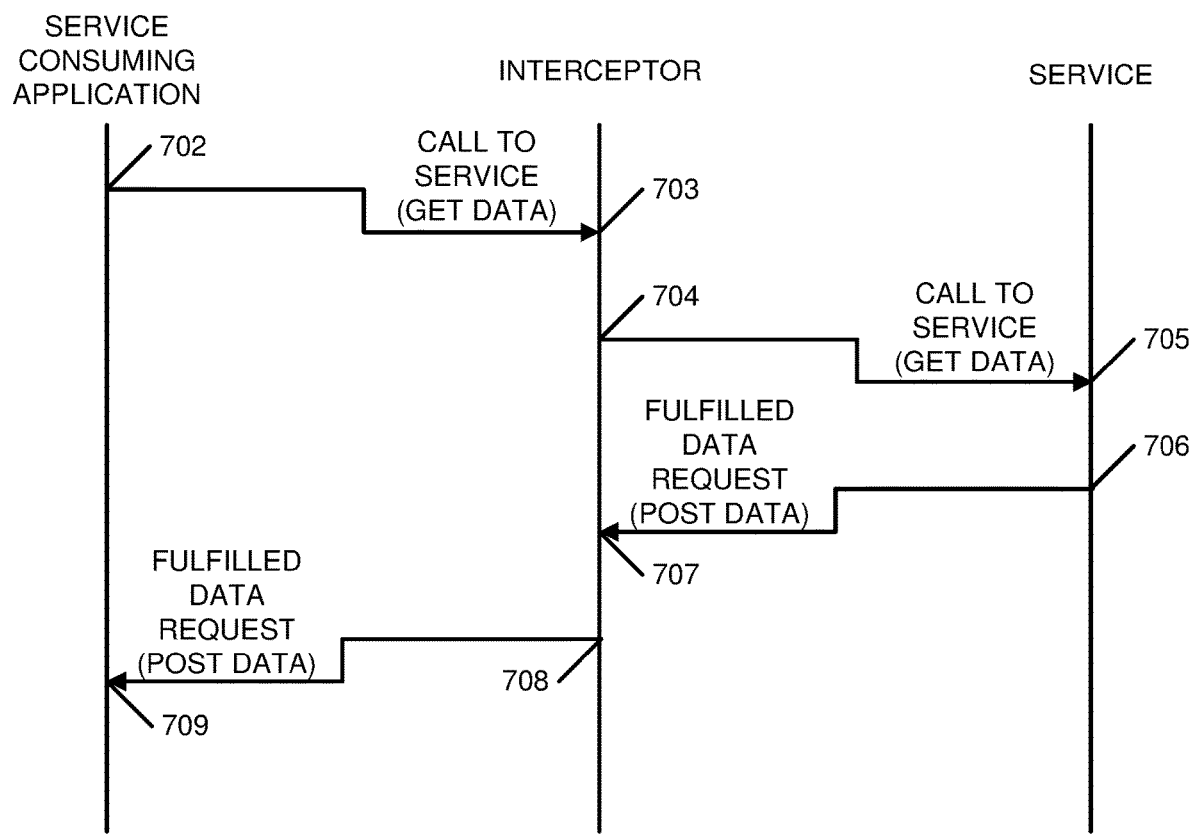
FIG. 7 is a data flow diagram illustrating a data flow that uses RESTful web services to transfer data.

FIG. 7 illustrates an example of a service-consuming application calling a RESTful web service via interceptor hub 114, and for purposes of explanation, the HTTP protocol is described. This is illustrative only and not intended to be limiting. At step 702, a service-consuming application executing in an application system makes a call to a service using the HTTP method GET to request data from the service. The call to the service may be routed to interceptor hub 114 based on a configuration of the application system on which the service-consuming application executes. Interceptor hub 114 may receive the call to the service at step 703, and may access database 116 to determine whether the service-consuming application is authorized to call the service. If the service-consuming application is authorized to call the service, then interceptor hub 114 may call the service based on an address obtained from database 116 using the HTTP method GET at step 704. The service may process the call to the service at step 705 and may provide a service response fulfilling the request for data by using the POST HTTP method at step 706. At step 707, interceptor hub 114 may receive the service response and may provide the service response to the service-consuming application using a second POST HTTP method at steps 708-709.

Figure 8:
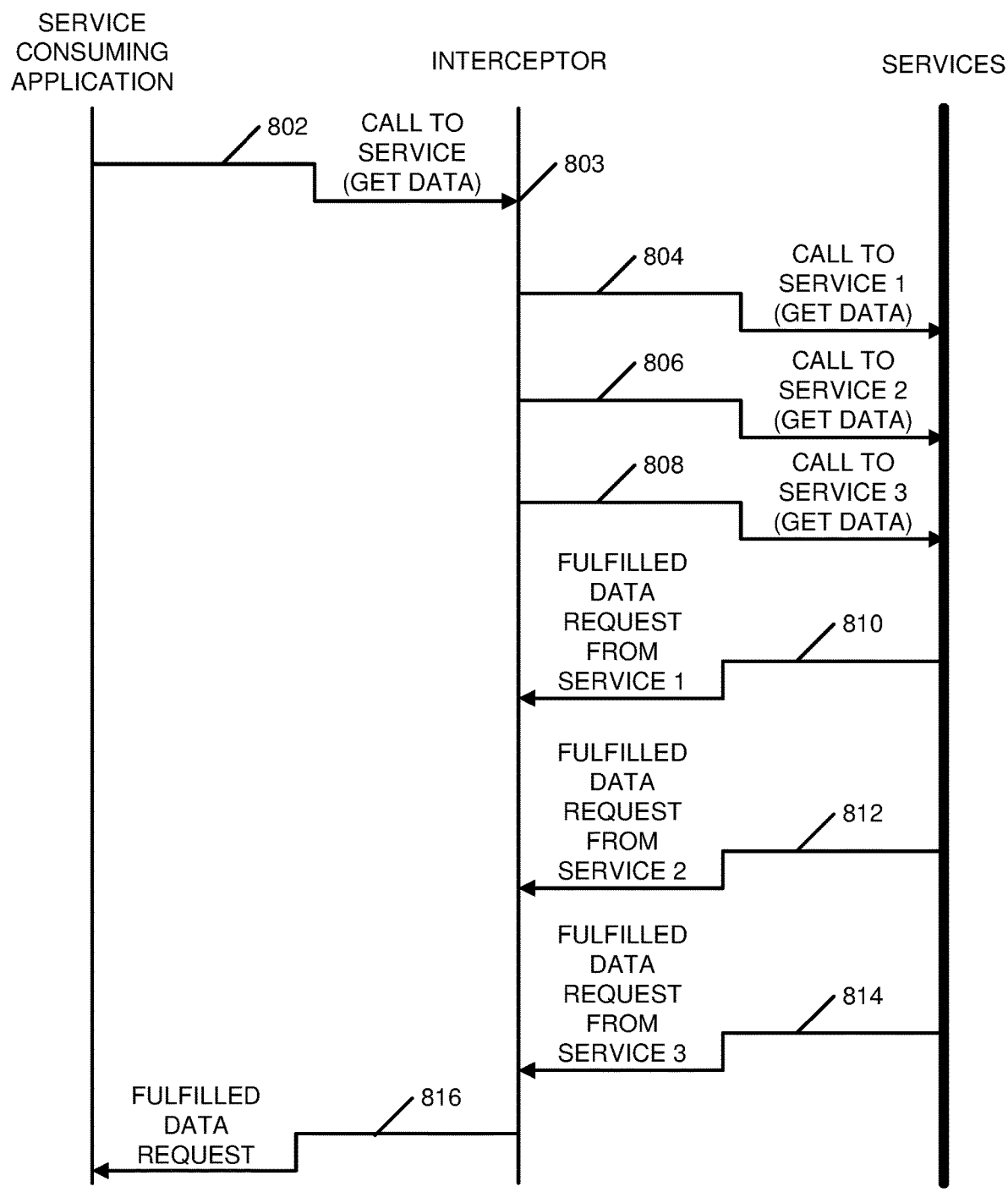
FIG. 8 illustrates an example data flow when an interceptor hub application receives a combined request to call multiple services.

In some embodiments, interceptor hub 114 may receive a call to a service that is an aggregated group of calls to multiple services. FIG. 8 illustrates a dataflow regarding such a call. Although, interceptor hub 114 may perform protocol and data conversion, as previously discussed, the details of such conversion are not mentioned in this example in order to simplify the explanation of this example dataflow. At step 802, a service-consuming application makes a single call that includes a call to multiple services. At step 803, interceptor hub 114 receives the call, performs any conversion needed for interceptor hub 114 to understand the call, and determines whether the service-consuming application is authorized to call the multiple services by accessing database 116. Assuming that the service-consuming application is authorized to call the multiple services, interceptor hub 114 may send calls to the multiple services at addresses obtained from database 116 (steps 804, 806, and 808).

In the example shown in FIG. 8, three calls are made to three different services. However, this is illustrative only, and fewer calls to services or more calls to services could be made based on a single call to a service received from a service-consuming application.

At steps 810, 812, 814 interceptor hub 114 receives service responses from the three different services. Although FIG. 8 shows the service responses being received in an order in which the calls to services were sent, the service responses may be received by interceptor hub 114 in a different order. After all of the service responses corresponding to the calls to services are received by interceptor hub 114 from the corresponding services, interceptor hub 114 may provide, to the service-consuming application, a single service response that combines the service responses from each of the multiple services (step 816). Thus, interceptor hub 114 may aggregate responses from multiple services that provide different data. The aggregated responses then may be sent back to the requesting service-consuming application as a single response to a single request. For example, assume that application A requests an amount of unpaid leave used year to date, annual salary, and current occupation code in a single request. The services may be provided by application B, application C, and application D, respectively. Through configuration or coding, interceptor hub 114 knows which services to request and makes the request or calls for the services. When the requests have been fulfilled, interceptor hub 114 may aggregate service responses into a single response to send back to the requesting service-consuming application.

By avoiding a tight coupling between service-consuming applications and services, the abovementioned embodiments provide flexibility in maintenance and support of application systems utilizing interface technologies that change in a manner that can be managed by interceptor hub 114 with little or no impact to application systems exchanging information. For example, because of a loose coupling between a service consuming application and a service, if a particular application system changes, only an interface between an interceptor hub and the particular application system may be impacted instead of affecting other application systems that partner with the particular application system.

In some embodiments, the interceptor hub may provide a single interface to a particular application system for use by other application systems that utilize different technologies and protocols.

An interceptor hub can be implemented in a number of topologies including, but not limited to: a local network implementation, (on premises), serving local partners only, remote partners only, or local and remote partners; and a cloud implementation (Infrastructure as a Service (IaaS), Platform as a Service (PaaS), Software as a Service (SaaS)), servicing local partners only, remote partners only, or local and remote partners.

Flexibility of various embodiments are best illustrated by the following example scenarios.

In a first scenario, application system ABC provides a service A. Application system XYZ uses service A via API management service A and protocol A. Application system XYZ changes to use API management service B. There are no changes to an interface to application system ABC. As application system XYZ is migrated to API management system B, interceptor hub can plug into API management system B to deliver service A data to application system XYZ. During a phased migration, the interceptor hub can use both API management service A and API management service B to deliver the service A data to application system XYZ. Sometime later, application system EFG would like to use service A provided by application system ABC with no changes to the interface to application system ABC. Application system EFG could use API management service A, API management service B, or another API management service. The interceptor hub may plug into one of the API management services used by application system EFG.

Sometime later, application system ABC migrates from technical stack 1 to technical stack 2, both hardware and technology stacks are changing. The interceptor hub can plug into application system ABC to use technical stack 2 and provide service responses from service A to application system XYZ and application system EFG without any changes being made to application system EFG and application system XYZ. The interceptor hub can provide service responses from application system ABC, service A, from both technical stack 1 and technical stack 2 through configuration options that enable a phased migration of application system ABC from technical stack 1 to technical stack 2. When the migration is complete, the interceptor hub system may be unplugged from application system ABC, service A, technical stack 1 with no impact to usage of application system ABC, service A by application system EFG and application system XYZ.

In a second scenario, application system XYZ utilizes application system ABC, service A, via API management service B utilizing protocol A. Application system XYZ elects to migrate to protocol B. There is no impact to application system ABC. In this scenario, the interceptor hub implemented multiple protocols for delivering services. The interceptor hub can configure delivery of service responses from application system ABC, service A, to application system XYZ utilizing protocol B. The migration could be configured as a phased migration.

Interceptor Hub User Interface

A user interface (UI), which may be a web interface, may be included in the interceptor hub to allow users to login and manage various aspects of the interceptor hub. The UI facilitates streamlining of data manipulation within the interceptor hub and allows users to manage clients and clients' access to interceptor-hub-hosted REST APIs and event streaming and processing message queues. In one implementation, the event streaming and processing message queues may include Kafka® topics (Kafka is a registered trademark of the Apache Software Foundation, a Delaware corporation).

Figure 9:
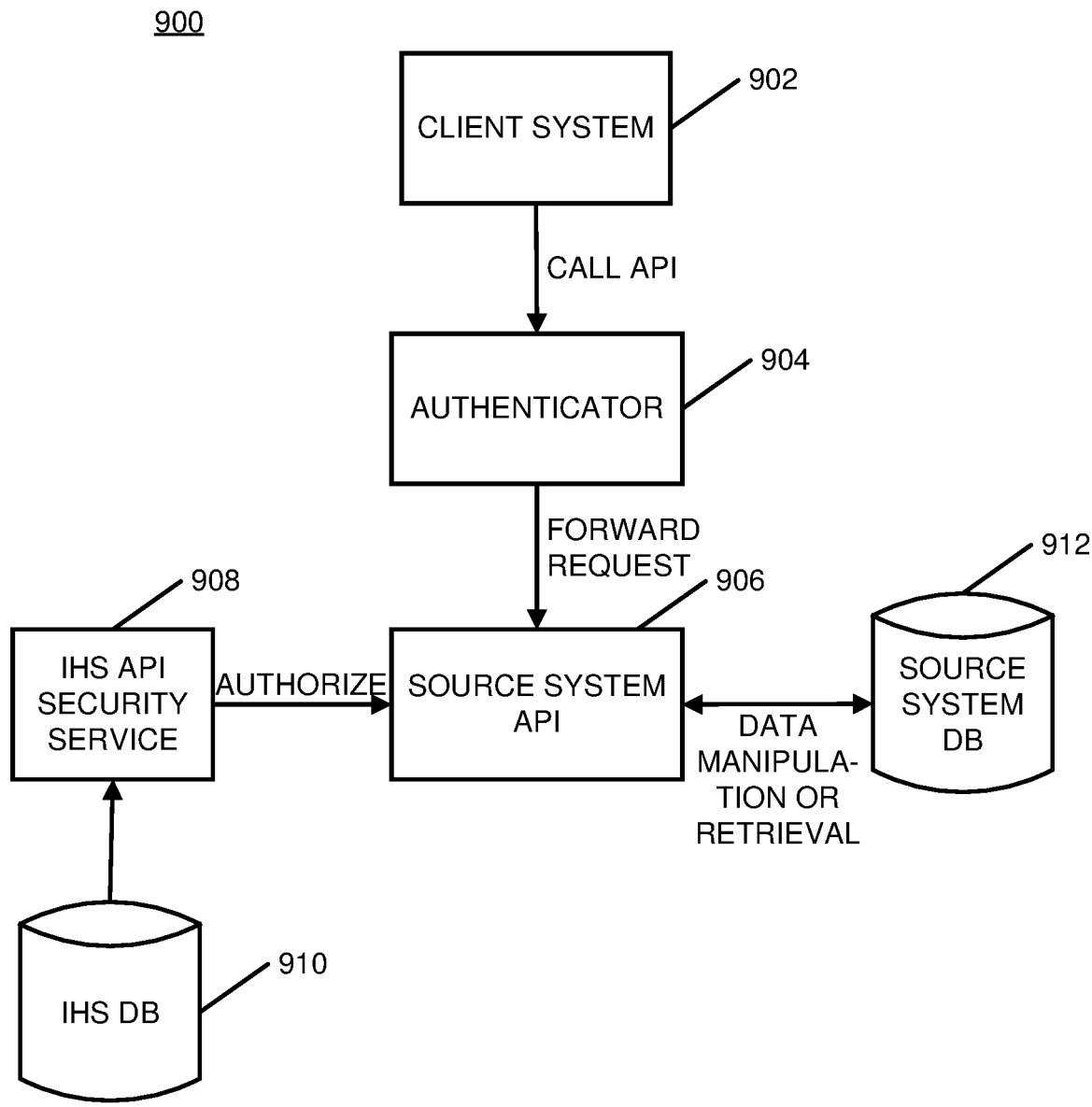
FIG. 9 shows components of a an interceptor hub system without a user interface feature.

FIG. 9 shows functional components of a system 900 which includes an interceptor hub without a UI. As shown, a client system 902 may send a request to call an API for a service. Authenticator 904 may receive the request and authenticate client system 902. In some implementations, authenticator 904 may include a DataPower® appliance or other appliance or service for authenticating a client system. After authenticator 904 authenticates client system 902 Authenticator 904 may forward the request to call the API to a source system API 906. Source system API 906 may request interceptor hub system application program interface (IHS API) security service 908 to determine whether client system 902 is authorized to access the API it requests to call. IHS API security service 908 may access interceptor hub system (IHS) database 910, which stores authorization data, to determine whether client system 902 is authorized to call the requested API. If source system API receives an authorization indication from IHS API security service 908 indicating that client system 902 is authorized to call the requested API, then source system API 906 may permit the requested API to be called to manipulate or retrieve data stored in source system database 912.

Figure 10:
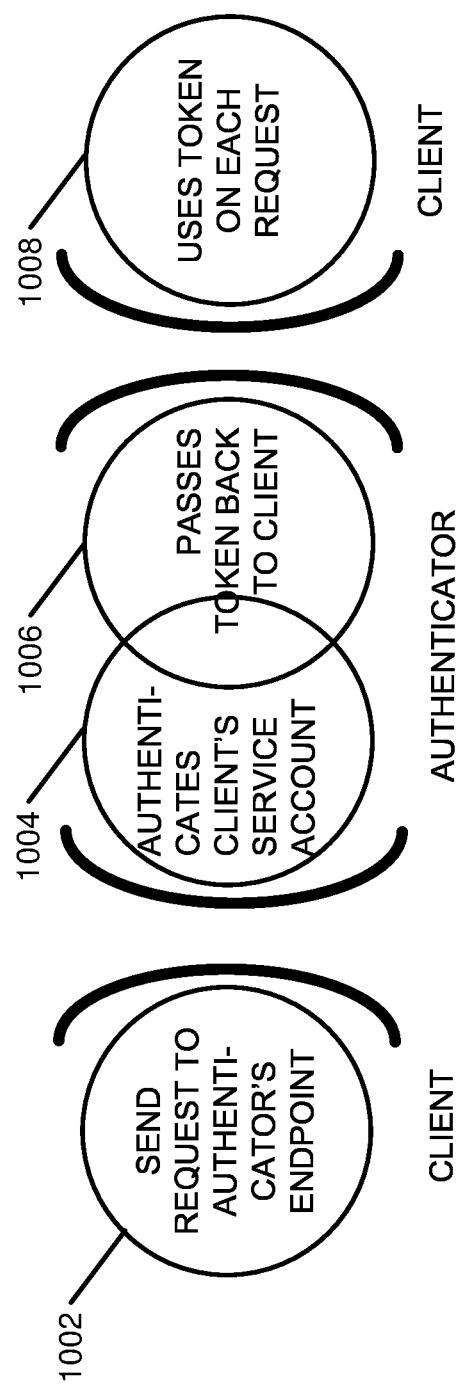
FIG. 10 illustrates a process by which a client system requests and receives permission to call an application program interface (API) according to embodiments.

FIG. 10 illustrates, in more detail, an authentication performed by authenticator 904. At 1002, client system 902 may send a request to call an API to an endpoint of authenticator 904. At 1004, authenticator 904 may authenticate a service account of client system 902, and at 1006, authenticator 904 may pass a token back to client system 902 if authenticated. At 1008, client system 902 may use the token on each request. Once client system 902 is authenticated by authenticator 904, client system 902 may potentially call any API. However, IHS is responsible for ensuring that client system 902 is authorized to access the requested API. Further IHS may use a client identifier when authenticating the client.

IHS database 910 may store authorization data as well as various datapoints that define a client, a source, an API, an API endpoint, and an access entry. A client record may define a client system that connects to an interceptor hub, while a source entry relates the client system to a source identifier that is given to the client system by the interceptor hub. The source identifier is created upon request by a client system user. In some implementations, the client system passes the source identifier with each authorization request to the interceptor hub. The IHS database defines all APIs hosted by the interceptor hub, endpoints that are available under each hosted API, and whether the endpoints are public or external. Internal APIs may be accessible only by the interceptor hub. An access entry defines which API and endpoint a given client identifier and source identifier is authorized to access.

Figure 11:
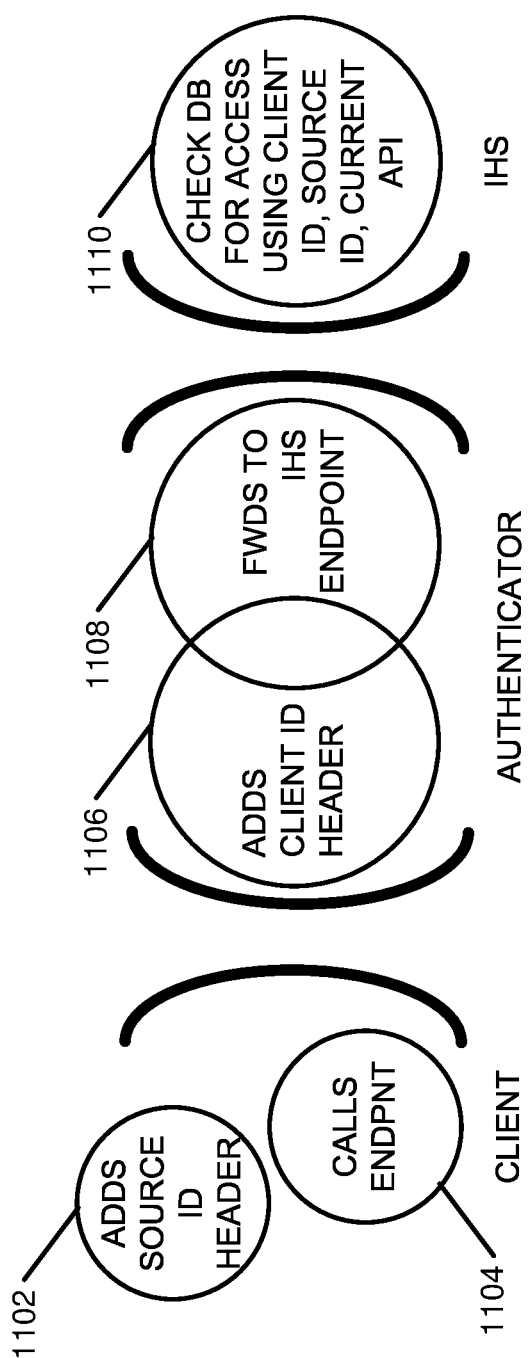
FIG. 11 shows an intercept hub authorization of a client system's call to an API endpoint after the client system's account had been authenticated according to embodiments.

FIG. 11 illustrates interceptor hub authorization of a client system's call to an API endpoint. A client system may add a source identifier header to a request to call the API endpoint 1102 and then may request the call to the API endpoint 1104. An authenticator may receive the request and may add a client identifier header to the request 1106. If the authenticator successfully authenticates the client system's account, then the request may be forwarded to an interceptor hub system endpoint 1108. The interceptor hub system may use the client identifier, the source identifier, and the requested API to check the IHS database to determine whether the client system is authorized to call the requested API 1110.

There are at least two ways that client systems can persist data into source systems via an interceptor hub system. A first way includes use of REST APIs and a second way includes use of an event streaming and processing platform, which may further include, but is not limited to, Kafka.

Figure 12:
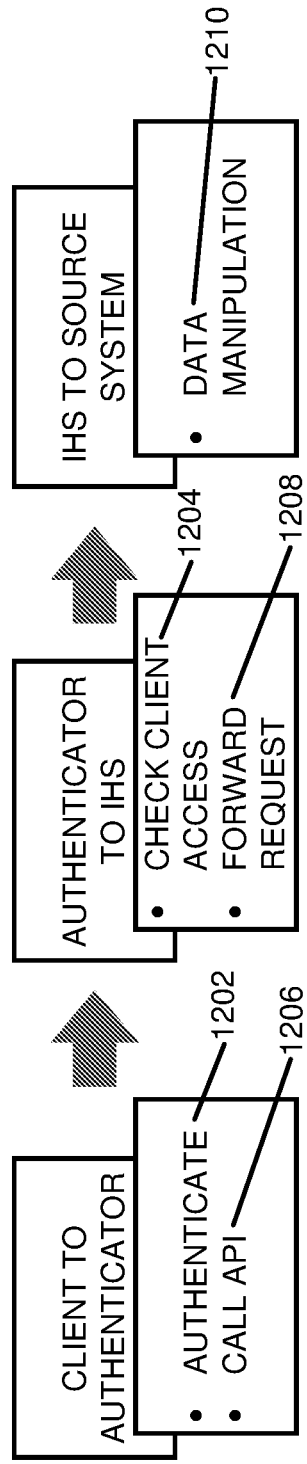
FIG. 12 illustrates, using REST APIs, persisting of data into a source system via an interceptor hub according to embodiments.

FIG. 12 illustrates persisting of data into a source system via an interceptor hub using REST APIs. Assuming all access had already been set up for a client system, the client system requests the authenticator to authenticate the client system's account 1202. The authenticator checks whether the client system should have access to the interceptor hub and returns an access token to the client system upon successful authentication 1204. The client system will use the access token with all subsequent requests. The client system then may make a call to the authenticator's REST API endpoint 1206 to request access to an interceptor hub endpoint. The authenticator then may check the access token provided by the client system via the call to make sure that the client system is authorized to call a service via the interceptor hub endpoint. If the client system is authorized, then the authenticator forwards the request to the interceptor hub endpoint 1208. Responsive to the call to the interceptor hub endpoint, the interceptor hub will check whether the client system is authorized to access an endpoint for the called service using the client system's client identifier, the source identifier, and the API+endpoint+method. API+endpoint+method represents a URL being called by the client along with an HTTP method being used. Main HTTP methods that may be supported by REST API include POST, PUT, PATCH, GET, and DELETE. If the client system is authorized to access the service, then the interceptor hub will perform duties of the service 1210 such as, for example, data manipulation.

Figure 13:
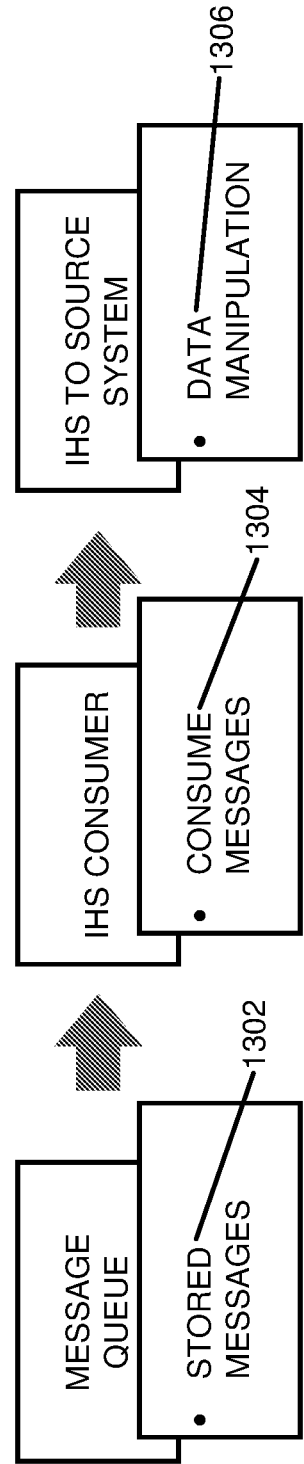
FIG. 13 shows an example method by which messages are consumed from a message queue of an event streaming and processing platform according to embodiments.

FIG. 13 illustrates a method of consuming messages from a message queue of an event streaming and processing platform that may include, but not be limited to, Kafka. Stored messages may be provided in message queues 1302. If Kafka is being used, the message queues are Kafka topics. The interceptor hub, acting as a consumer, may consume the messages 1304 and may persist the messages to source system 1306, where the data from the messages may be manipulated.

If Kafka is being used as the event streaming and processing platform, another method for persisting stored messages may include providing stored messages from Kafka topics to a Kafka connect sink, which consumes and persists the messages to the source system.

There are at least three methods by which client systems can retrieve source system data via an interceptor hub. A first method uses REST APIs, a second method uses an event streaming and processing platform, which may include, but not be limited to, Kafka, and a third method is by setting up a scheduled process to have the interceptor hub send data from one system to another. Assuming all access had been setup for a client system, the first method is nearly identical to the process illustrated in FIG. 12. The process differs only at 1210, where instead of performing data manipulation, data retrieval may be performed.

Figure 14:
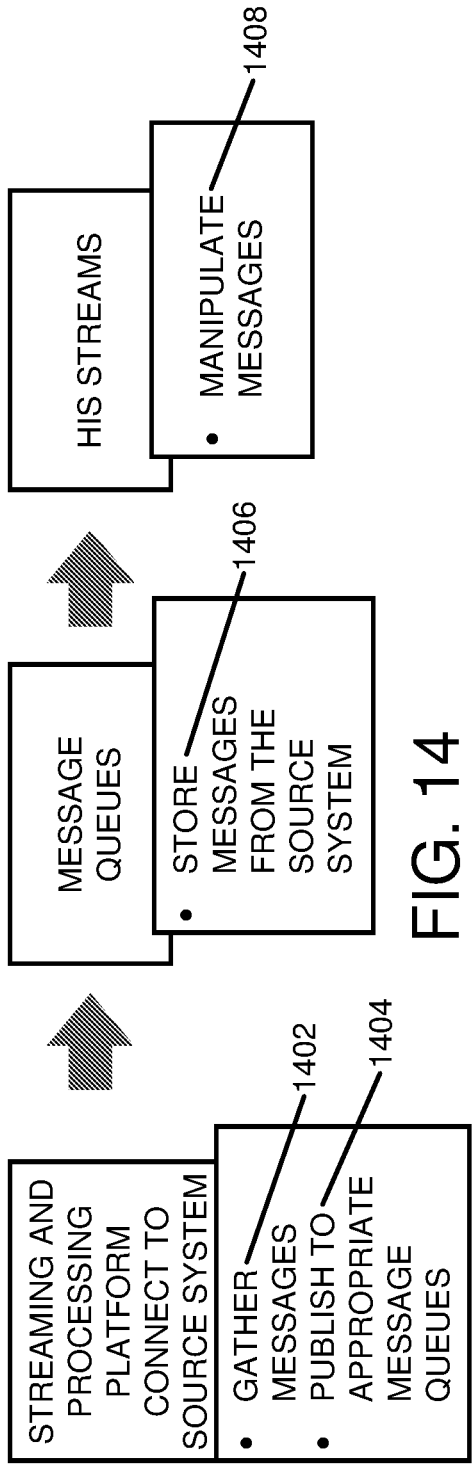
FIG. 14 illustrates an event streaming and processing platform with running connectors that gather messages from a source system and publishes the messages to message queues, where the messages are ready for consumption according to embodiments.

FIG. 14 illustrates the second method. In this method, an event streaming and processing platform, which may include, but is not be limited to Kafka, is connected through the interceptor hub to a given source system. The event streaming and processing platform may have connectors running that gather messages from a given source system 1402 and publishes the messages to one or more message queues 1404 where they are stored 1406. The messages then may be ready for consumption by a client system, or the interceptor hub itself may further manipulate the messages to make them ready for consumption 1408.

Figure 15:
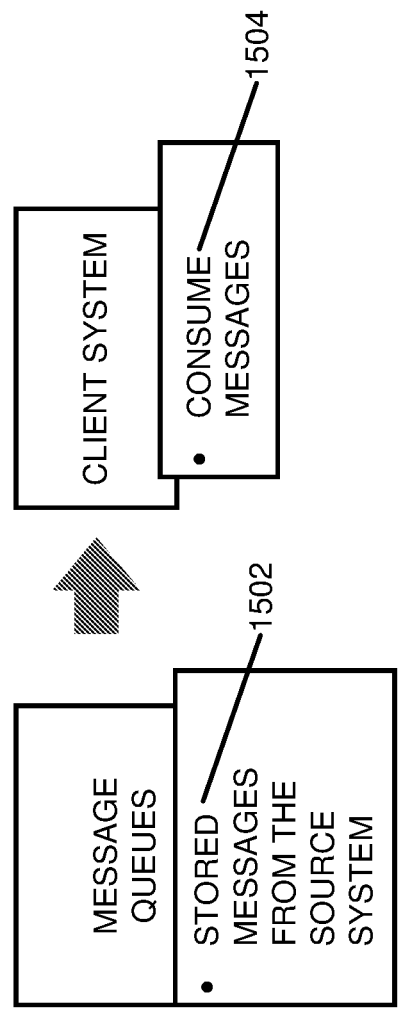
FIG. 15 shows a client system consuming messages that are replicated into the client system from message queues and consumed via use of a connect sink according to embodiments.

There are various ways in which a client system can consume messages from a source system. One way is illustrated by FIG. 15. As shown in FIG. 15, messages stored in one or more message queues 1502 may be replicated into the client system and consumed by using a connect sink 1504.

A method by which data can be gathered from a first source system and sent to a second system is by setting up a scheduled process in the interceptor hub to periodically gather the data from the first source system and providing the gathered data to the second system, which may include a REST API, a database, etc.

In one embodiment, a user interface may be made using ReactJS as a frontend and Spring Boot® (Spring Boot is a registered trademark of Pivotal Software, Inc., a Delaware corporation) as a backend. ReactJS may execute on a client system while Spring Boot® may execute on a server such as a server executing an interceptor hub. In other embodiments, products similar to ReactJS and Spring Boot® may be used instead. For example, instead of using ReactJS, Angular® (Angular is a registered trademark of Google LLC, a Delaware Limited Liability Company), VueJS, or another UI framework could be used in embodiments. Instead of using Spring Boot®, Quarkus, Apache Struts, or another framework may be used in embodiments. In some embodiments, the server may be tasked with making internal calls so that a user will be unable to manipulate requests from a browser.

Using the user interface, developers can enter new data in any environment, such as a development environment, a system integration testing environment, a customer acceptance testing environment, or a production environment. The following services may be added to an existing infrastructure of an interceptor hub system to implement a user interface feature:

A resource service for managing Active Directory authentication of users and managing Java Web Tokens;
    A user service to provide a user's authorization and permissions within the user interface;
    A user management service to manage a user's access within the user interface;
    An API owner service to determine who owns which APIs such that an API owner can manage his or her own APIs;
    A message queue owner service manages data within an IHS database in order to determine who owns which message queues so that a message queue owner can manage his or her own message queues;

An event streaming and processing platform service to manage an access control list within the event streaming and processing platform for client system access to message queues.

The user interface may include a number of components that are responsible for specific aspects of an interceptor hub infrastructure, including, for example, an API management component, an event streaming and processing component, and a utility management component.

Figure 16:
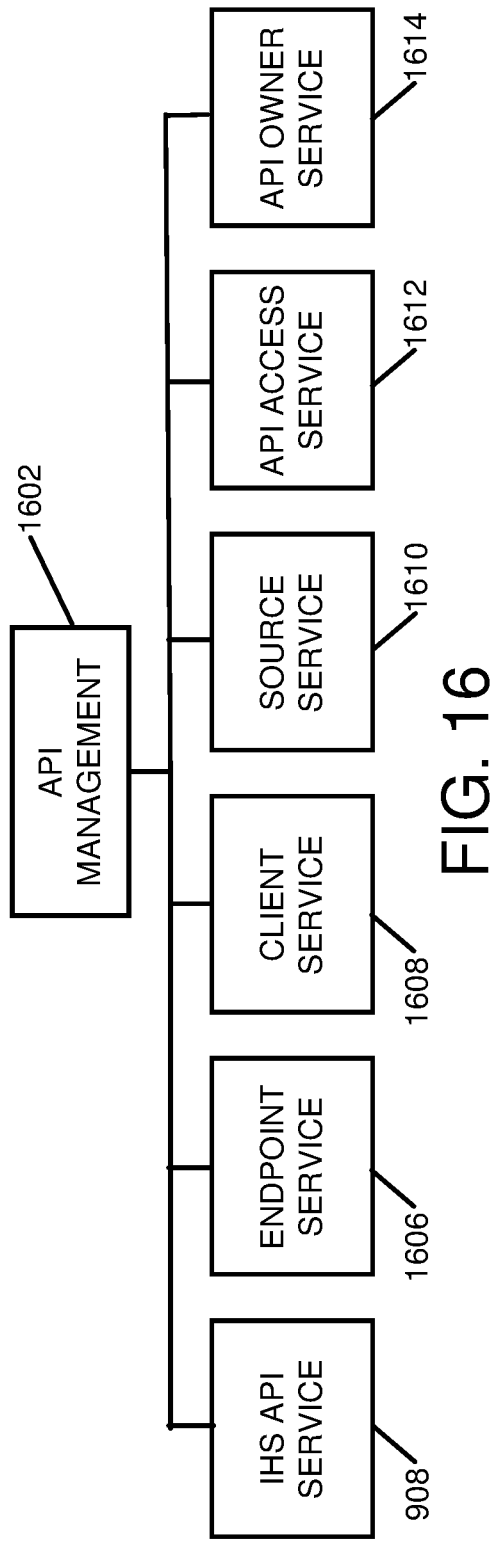
FIG. 16 shows an API management user interface component that communicates with interceptor hub services and allows users to manage and control access to their own APIs according to embodiments.

FIG. 16 shows an API management user interface component 1602 communicating with a number of interceptor hub services. API management user interface component 1602 is responsible for allowing users to manage their APIs and control who can access their APIs. The interceptor hub services relate to client and source information, APIs/endpoints, and access information. For example, in an embodiment, API management component 1602 may communicate with service components that may include, but not be limited to, an IHS API security service 908, an endpoint service 1606, a client service 1608, a source service 1610, and an API access service 1612, as well as an API owner service 1614. IHS API security service 908 may verify that a client is authenticated (i.e., registered in IHS database 910) and authorized to access a requested service (i.e., registered to access the requested service/endpoint). Endpoint service 1606 may manage endpoints within IHS database 910 by creating, retrieving, updating, and deleting resources. Client service 1608 may manage clients within IHS database 910 by creating, retrieving, updating, and deleting resources. Source service 1610 may manage sources within IHS database 910 by creating, retrieving, updating, and deleting resources. API access service 1612 may manage client/source access to API/Endpoints within IHS database 910 by creating, retrieving, updating, and deleting resources.

Figure 17:
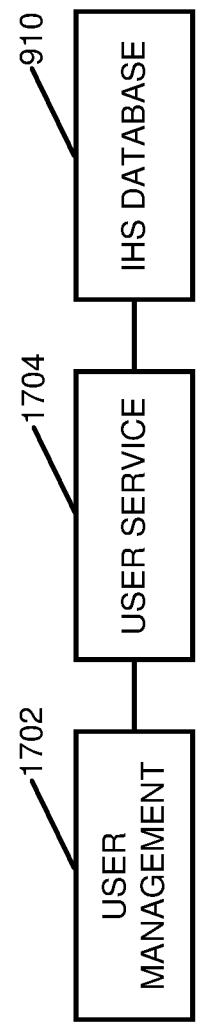
FIG. 17 illustrates a user management user interface component to manage a user's profile and permissions within the interceptor hub according to embodiments.

FIG. 17 shows an example user management user interface component 1702 that is responsible for managing a user's profile and permissions within the interceptor hub. User management user interface component 1702 communicates with user service 1704. The user service 1704 further accesses and stores data to IHS database 910.

Figure 18:
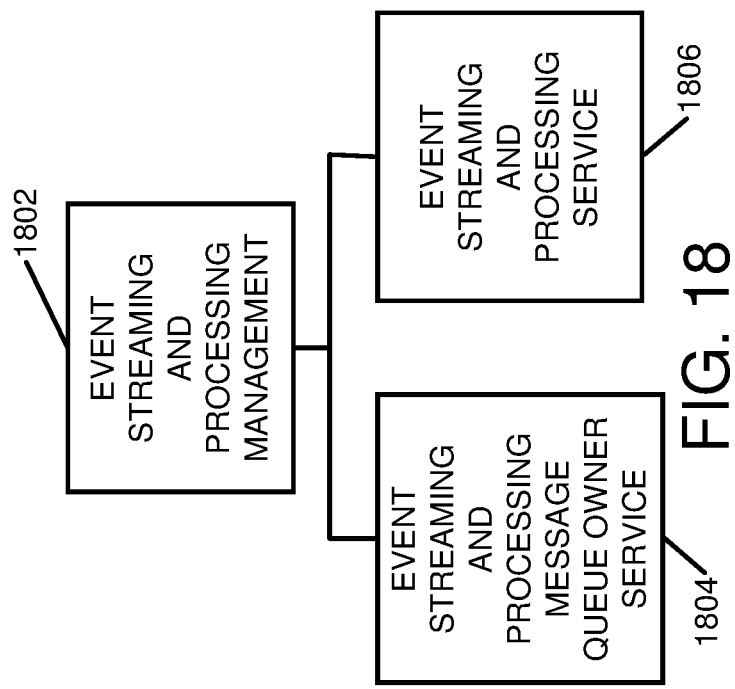
FIG. 18 illustrates an event streaming and processing management component that allows users to manage and control access to their own message queues according to embodiments.

FIG. 18 illustrates an event streaming and processing management user interface component 1802, which is responsible for allowing users to manage their own message queues and control who can access their message queues. Event streaming and processing user interface component 1802 communicates with an event streaming and processing message queue owner service 1804, which is responsible for determining who owns which message queues so that an owner may manage their own message queues. Event streaming and processing management user interface component 1802 also communicates with an event streaming and processing service 1806, which is responsible for managing an access control list within the event streaming and processing service for client access to message queues and for managing the message queues within an event streaming and processing platform.

Figure 19:
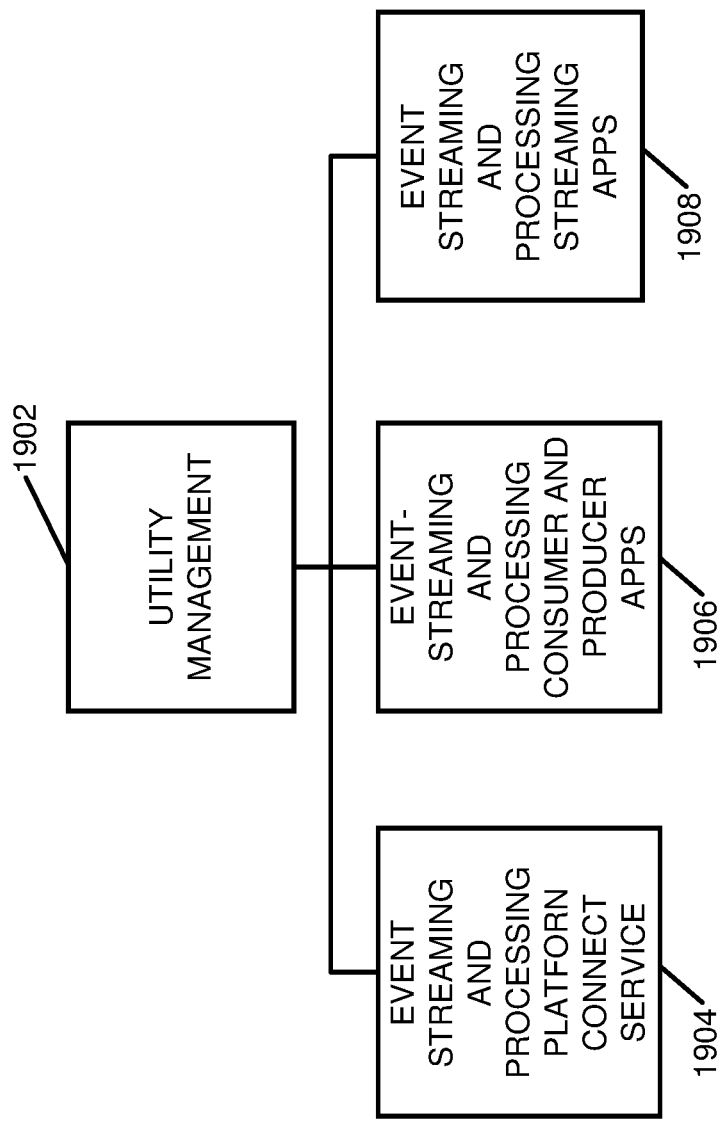
FIG. 19 shows a utility management user interface component that allows users to manage interceptor hub utilities that may have processes to be restarted or rerun and that communicates with an event streaming and processing platform connect service, event streaming and processing consumer and producer applications, and event streaming and processing streaming applications according to embodiments.

FIG. 19 shows a utility management user interface component 1902 responsible for allowing users to manage utilities that the interceptor hub uses, which may have processes that are to be restarted or rerun. Utility management user interface component 1902 may communicate with an event streaming and processing platform connect service 1904, which puts data into the event streaming and processing platform, may communicate with event streaming and processing consumer and producer apps 1906, which take data out of the event streaming and processing platform, and may communicate with event streaming and processing streaming apps 1908.

Each user may have only one assigned role per user interface. API management roles may include api_admin, api_manager, and api_user. Any user may use parts of the user management user interface component 1702. Event streaming and processing management roles may include es&p_admin, es&p_manager, and es&p_user. Utility management user interface component 1902 may only be used by a user having an ihs_admin role. The ihs_admin role may have access to do anything that any role permits.

The following further defines the above-mentioned roles:

ihs_admin
    This role is meant for users, usually interceptor hub developers, for controlling internal workings of IHS and for doing anything else within the interceptor hub application that other roles can do. The ihs_admin role is like a super user in other systems. In various embodiments, a user with the ihs_admin approves api_admin user profile requests and es&p_admin user profile requests.

api_admin
    The role is meant for users, usually team leads, to register, modify, or delete APIs, endpoints, client systems, and sources they own. The users with this role also are able to do anything that a user with an api_user role can do. In various embodiments, a user with the api_admin role approves user profile requests from a user assigned the api_manager role.

api_manager
    This role is meant to be assigned to users, usually business partners, for approving access requests to any APIs they own from other systems or even their own systems. In various embodiments a user assigned the api_manager role may approve profile requests from users assigned the api_user role.

api_user
    This role is meant for users, usually developers, that want to view a catalog of available APIs and request access to those available APIs for client systems and sources to which they have access.

es&p_admin
    This role is meant to be assigned to users, usually the team leads, that register, modify, or delete event streaming and processing message queues and client systems they own. Further, users assigned the es&p_admin role also can do everything that a user assigned the es&p_user role can do. In various embodiments, a user assigned the es&p_admin role approves profile requests from users assigned the es&p_manager role.

es&p_manager
    This role is meant to be assigned to users, usually business partners, for approving access requests to any es&p message queues they own from other systems or even their own system. Users with this role also approve user requests from users assigned the ES&P_user role.

es&p_user
    This role is meant to be assigned to users, usually developers, who want to view a catalog of available message queues and be able to request access to message queues for client systems to which the users assigned this role have access.

api_readonly
  This role is meant to be assigned to users who only want to view a catalog of available APIs.
es&p_readonly
  This role is meant to be assigned to users who only want to view a catalog of available es&p message queues.

A user assigned the ihs_admin role has all permissions assigned to him or her. All other users have assigned permissions that are specific to their assigned role. The permissions may provide a more fine-grained control over what a user is permitted to see and have access to. The permissions are intended to provide a user with control over their own APIs and control over who can access them, as well as providing the user with control over their own client systems and sources.

A profile defines all of a user's permissions, which controls what the user has access to within the interceptor hub user interface and what the user can do. In various embodiments, profile approvals are performed by a user having a next higher role. For example, a user assigned the api_admin role and a user assigned the es&p_admin role have profiles that are approved by a user assigned the ihs_admin role. A user assigned the api_manager role and a user assigned the es&p_manager role may have their profiles approved by a user assigned the api_admin role and a user assigned the es&p_admin role, respectively. A user assigned the api_user role and a user assigned the es&p_user role have their profiles approved by a user assigned the api_manager role and a user assigned the es&p_manager role, respectively.

There are a number of processes that are to be completed for data to be entered into an interceptor hub system. Previously, only interceptor hub developers could enter data through digital workflow management software change requests without a user interface. In some embodiments, the digital workflow management software may include, but not be limited to, SERVICENOW® (SERVICENOW is a registered trademark of ServiceNow, Inc., a Delaware Corporation). To get new data into the system, a developer would create scripts appropriate to the request for access or to add new client systems, sources, or API/endpoints. The script then may be passed through each environment and finally deployed to a production deployment by a database administrator.

The following are example scenarios. Scenario 1a is an example scenario for providing an existing client system with access to a REST API/endpoint without use of a user interface.

Scenario 1a
  1. An existing client requests access to an API/endpoint via email;
  2. A development team works with the client system to ensure that the client system is registered in the interceptor hub system;
  3. The development team creates scripts to give the client system's client identifier and source identifier access to the requested API and endpoint;
  4. The development team deploys the script to development/system integration testing environments;
  5. The development team submits a change request to deploy the script to a customer acceptance testing environment;
     a. A database administrator runs the script in the customer acceptance testing environment;
  6. The development team submits a change request to deploy the script in a production environment;
     b. The database administrator runs the script in the production environment; and
  7. The client system now has access to the API/endpoint.

Scenario 1b is an example scenario for providing an existing client system with access to a REST API/endpoint with use of a user interface.
  1. A client system user requests access to an API/endpoint within the user interface;
  2. A manager of the requested API/endpoint reviews and approves the request; and
  3. The client now has access to the API/endpoint.

As can be seen, scenario 1b is much simpler with use of the user interface than scenario 1a without use of the user interface. Further, scenario 1b eliminates use of the development team to and the database administrator to provide the existing client system with access to the REST API/endpoint.

Scenario 2a is an example scenario that may be performed for requesting and creating a new client system without use of a user interface.

Scenario 2a
  1. A user requests a client system to be created via email;
  2. A development team creates a script to create the client system's client identifier and source identifier;
  3. The development team deploys the script to the development and system integration testing environments;
  4. The development team submits a change request to deploy the script to the customer acceptance testing environment;
     a. A database administrator runs the script in the customer acceptance testing environment;
  5. The development team submits a change request to deploy the script to the production environment;
     a. The database administrator runs the script in the production environment; and
  6. The client system now exists.

Scenario 2b is an example scenario that may be performed for requesting and creating a new client system with use of a user interface.

Scenario 2b
  1. An user assigned either the ihs_admin role or the api_admin role creates a client system and source using a user interface. The user assigned the ihs_admin role can create a new client for any team, while the user assigned the api_admin role can create a new client only for his or her own team(s).

As can be seen, scenario 2b is much simpler with use of the user interface than scenario 2a without use of the user interface. Further, scenario 2b eliminates use of the development team and a database administrator.

Figure 20:
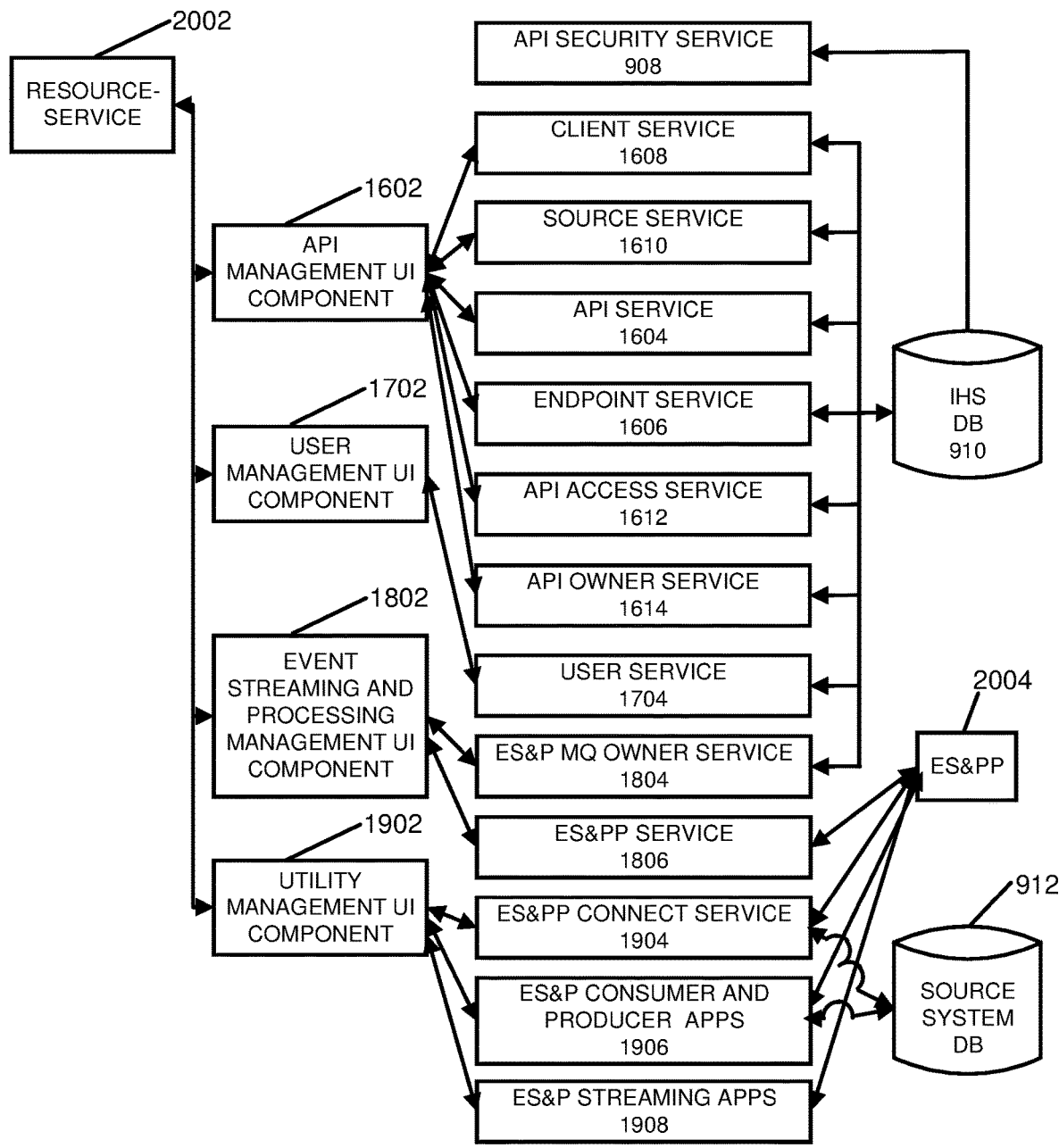
FIG. 20 illustrates a user-interface-focused diagram showing user interface components and corresponding services with which the user interface components communicate according to embodiments.

FIG. 20 illustrates a user-interface-focused diagram of an example embodiment. A resource service 2002 provides access to the API management user interface component 1602, the user management user interface component 1702, the event streaming and processing management user interface component 1802, and the utility management user interface component 1902.

The API management user interface component 1602 communicates with the client service 1608, the source service 1610, the API service 1604, the endpoint service 1606, the API access service 1612, and the API owner service 1614.

The user management user interface component 1702 communicates with the user service 1704.

The event streaming and processing management user interface component 1802 communicates with the event streaming and processing message queue owner service 1804 and the event streaming and processing platform service 1806. The event streaming and processing platform service 1806 communicates with an event streaming and processing platform 2004.

The utility management user interface component 1902 communicates with the event streaming and processing platform connect service 1904, the event streaming and processing consumer and producer apps 1906, and the event streaming and processing streaming apps 1908. Each of the event streaming and processing platform connect service 1904, the event streaming and processing consumer and producer apps 1906, and the event streaming and processing streaming apps 1908 communicate with the event streaming and processing platform 2004. The event streaming and processing platform connect service 1904 and the event streaming and processing consumer and producer apps 1906 communicate with the source system database 912.

Each of services 1604-1614 and services 1704 and 1804 communicate with interceptor hub system database 910.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or improvement over conventional technologies, or to enable others of ordinary skill in the art to understand the embodiments disclosed herein.

Aspects of the present invention are described herein with reference to flowchart illustrations and/or block diagrams of methods, apparatus (systems), and computer-readable storage devices having instructions stored therein for carrying out functions according to embodiments of the invention. It will be understood that each block of the flowchart illustrations and/or block diagrams, and combinations of blocks in the flowchart illustrations and/or block diagrams, can be implemented by computer readable program instructions. Each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The invention claimed is:

1. A method for providing a user interface for an interceptor hub application, the method comprising:
   receiving via a network, by the interceptor hub application executing on a first computing device, a request for a plurality of services from a first service-consuming application executing on a second computing device, the plurality of services executing on at least one other computing device and being accessible via the first computing device through the network, the request being in a first format for an interceptor interface;
   converting, by the interceptor hub application, at least some information in the received request to a second format of a corresponding interface of at least one of the requested plurality of services;
   sending, by the interceptor hub application, a respective request to the each of the requested plurality of services executing on a corresponding one of the at least one other computing device, at least some of the respective requests including a corresponding portion of the information in the second format;
   receiving, by the interceptor hub application, a respective service response from the each of the plurality of respective services;
   providing, by the interceptor hub application, each of the respective service responses in a combined service response to the first service-consuming application in a corresponding response format expected by the first service-consuming application;

receiving, via the user interface of the interceptor hub application, a first request from a user of a client for permission to access a first application program interface/endpoint;

providing, by the interceptor hub application, the first request to a first manager of the first application program interface/endpoint;

receiving, via the interceptor hub application, approval of the first request from the first manager responsive to the providing of the first request to the first manager; and providing, by the interceptor hub application, the client with access to the first application program interface/endpoint responsive to the receiving of the approval of the first request.

2. The method of claim 1, further comprising:

receiving, via the user interface, a request for a new client; and creating the new client in response to the receiving of the request for the new client.

3. The method of claim 2, further comprising:

providing, from the new client via the user interface of the interceptor hub application to an authenticator, a second request to access a second application program interface/endpoint;

receiving, by the interceptor hub application from the authenticator, the second request with an access token upon successful authentication by the authenticator of the new client to access the second application program interface/endpoint;

authenticating, by the interceptor hub application, the new client to access the second application program interface/endpoint responsive to the receiving of the second request with the access token from the authenticator; and providing, by the interceptor hub application, the new client with access to the second application program interface/endpoint responsive to the authenticating by the interceptor hub application.

4. The method of claim 1, further comprising:

providing, by the interceptor hub application, an application program interface owner service to determine who owns an application program interface, the application program interface owner service providing an owner of the application program interface an ability to manage the application program interface.

5. The method of claim 1, further comprising:

providing a user management service to manage access by a user within the user interface; and providing a user service to provide authorizations and permissions of the user within the user interface.

6. The method of claim 1, further comprising:

controlling a plurality of components of the user interface for a user based on a role assigned to the user from a plurality of roles, the plurality of roles including: an interceptor hub system admin role; application program interface roles, and event stream processing roles, wherein:

the application program interface roles and the event stream processing roles each include a respective admin role, a respective manager role, and a respective user role.

7. The method of claim 6, wherein:

a first user assigned to the interceptor hub system admin role can control inner workings of the interceptor hub application and can perform anything that a user assigned to any other role can do, a second user assigned to an application program interface admin role of the application program interface roles can register, modify, and delete application program interface/endpoints, clients, and sources owned by the second user, a third user assigned to an application program interface manager role of the application program interface roles can approve access requests to any application program interfaces owned by the third user, and can approve application program interface user profile requests, a fourth user assigned to an application program interface user role can view a catalog of available application program interfaces and can request access to application program interfaces for clients and sources to which the fourth user has access, a fifth user assigned to an application program interface read only user role of the application program interface roles can only view the catalog of available application program interfaces, a sixth user assigned to an event stream processing admin role of the event streaming and processing management roles can register, modify, and delete logs of events and clients owned by the sixth user, and can perform anything that a user assigned to an event stream processing user role can do, a seventh user assigned to an event stream processing manager role of the event streaming and processing roles can approve access requests to logs of events owned by the seventh user, an eighth user assigned to an event stream processing user role of the event streaming and processing roles can view a catalog of available logs of events, and can request access to logs of events for clients to which the eighth user has access, and a ninth user assigned to an event stream processing read only role of the event streaming and processing roles can only view the catalog of the available logs of events.

8. A system for providing a user interface for an interceptor hub application, the system comprising:

at least one processor;

at least one memory; and a bus, wherein the system is configured to perform:

executing the interceptor hub application;

receiving via a network, by the interceptor hub application executing on a first computing device included in the system, a request for a plurality of services from a first service-consuming application executing on a second computing device, the plurality of services executing on at least one other computing device and being accessible via the first computing device through the network, the request being in a first format for an interceptor interface;

converting, by the interceptor hub application, at least some information in the received request to a second format of a corresponding interface of at least one of the requested plurality of services;

sending, by the interceptor hub application, a respective request to the each of the requested plurality of services executing on a corresponding one of the at least one other computing device, at least some of the respective requests including a corresponding portion of the information in the second format;

receiving, by the interceptor hub application, a respective service response from the each of the plurality of respective services;

providing, by the interceptor hub application, each of the respective service responses in a combined service response to the first service-consuming application in a corresponding response format expected by the first service-consuming application;
receiving, via the user interface of the interceptor hub application, a first request from a user of a client for permission to access a first application program interface/endpoint;
providing, by the interceptor hub application, the first request to a first manager of the first application program interface/endpoint;
receiving, via the interceptor hub application, approval of the first request from the first manager responsive to the providing of the first request to the first manager; and
providing, by the interceptor hub application, the client with access to the first application program interface/endpoint responsive to the receiving of the approval of the first request.

9. The system of claim 8, wherein the system is further configured to perform:
receiving, via the user interface, a first request for a new client; and
creating the new client in response to the receiving of the first request for the new client.

10. The system of claim 9, wherein the system is further configured to perform:
providing, from the new client via the user interface of the interceptor hub application to an authenticator, a second request to access a second application program interface/endpoint;
receiving, by the interceptor hub application from the authenticator, the second request with an access token upon successful authentication by the authenticator of the new client to access the second application program interface/endpoint;
authenticating, by the interceptor hub application, the new client to access the second application program interface/endpoint responsive to the receiving of the second request with the access token from the authenticator; and
providing, by the interceptor hub application, the new client with access to the second application program interface/endpoint responsive to the authenticating by the interceptor hub application.

11. The system of claim 8, wherein the system is further configured to perform:
providing, by the interceptor hub application, an application program interface owner service to determine who owns an application program interface, the application program interface owner service providing an owner of the application program interface an ability to manage the application program interface.

12. The system of claim 8, wherein the system is further configured to perform:
providing a user management service to manage access by a user within the user interface;
providing a user service to provide authorizations and permissions of the user within the user interface; and
providing a real-time event stream processing user interface component to allow respective users to manage logs of events that the respective users own.

13. The system of claim 8, wherein the system is further configured to perform:
controlling a plurality of components of the user interface for a user based on a role assigned to the user from a plurality of roles, the plurality of roles including: an interceptor hub system admin role; application program interface roles, and event stream processing roles, wherein:
the application program interface roles and the event stream processing roles each include a respective admin role, a respective manager role, and a respective user role.

14. The system of claim 13, wherein:
a first user assigned to the interceptor hub system admin role can control inner workings of the interceptor hub application and can perform anything that a user assigned to any other role can do,
a second user assigned to an application program interface admin role of the application program interface roles can register, modify, and delete application program interface/endpoints, clients, and sources owned by the second user,
a third user assigned to an application program interface manager role of the application program interface roles can approve access requests to any application program interfaces owned by the third user, and can approve application program interface user profile requests,
a fourth user assigned to an application program interface user role can view a catalog of available application program interfaces and can request access to application program interfaces for clients and sources to which the fourth user has access,
a fifth user assigned to an application program interface read only user role of the application program interface roles can only view the catalog of available application program interfaces,
a sixth user assigned to an event stream processing admin role of the event streaming and processing roles can register, modify, and delete logs of events and clients owned by the sixth user, and can perform anything that a user assigned to an event stream processing user role can do,
a seventh user assigned to an event stream processing manager role of the event streaming and processing roles can approve access requests to logs of events owned by the seventh user,
an eighth user assigned to an event stream processing user role of the event streaming and processing roles can view a catalog of available logs of events, and can request access to logs of events for clients to which the eighth user has access, and
a ninth user assigned to an event stream processing read only role of the event streaming and processing roles can only view the catalog of the available logs of events.

15. A non-transitory computer-readable medium having instructions recorded thereon, wherein when the instructions are executed by a processor of a first computing device, the first computing device is configured to perform:
receiving via a network, by an interceptor hub application executing on a first computing device, a request for a plurality of services from a first service-consuming application executing on a second computing device, the plurality of services executing on at least one other computing device and being accessible via the first computing device through the network, the request being in a first format for an interceptor interface;
converting, by the interceptor hub application, at least some information in the received request to a second format of a corresponding interface of at least one of the requested plurality of services;

sending, by the interceptor hub application, a respective request to the each of the requested plurality of services executing on a corresponding one of the at least one other computing device, at least some of the respective requests including a corresponding portion of the information in the second format;

receiving, by the interceptor hub application, a respective service response from the each of the plurality of respective services;

providing, by the interceptor hub application, each of the respective service responses in a combined service response to the first service-consuming application in a corresponding response format expected by the first service-consuming application;

receiving, via a user interface of the interceptor hub application, a first request from a user of a client for permission to access a first application program interface/endpoint;

providing, by the interceptor hub application, the first request to a first manager of the first application program interface/endpoint;

receiving, via the interceptor hub application, approval of the first request from the first manager responsive to the providing of the first request to the first manager; and providing, by the interceptor hub application, the client with access to the first application program interface/endpoint responsive to the receiving of the approval of the first request.

16. The non-transitory computer-readable medium of claim 15, wherein when the instructions are executed by the processor of the first computing device, the first computing device is further configured to perform:

receiving, via the user interface, a first request for a new client; and creating the new client in response to the receiving of the first request for the new client.

17. The non-transitory computer-readable medium of claim 15, wherein when the instructions are executed by the processor of the first computing device, the first computing device is further configured to perform:

providing, from the new client via the user interface of the interceptor hub application to an authenticator, a second request to access a second application program interface/endpoint;

receiving, by the interceptor hub application from the authenticator, the second request with an access token upon successful authentication by the authenticator of the new client to access the second application program interface/endpoint;

authenticating, by the interceptor hub application, the new client to access the second application program interface/endpoint responsive to the receiving of the second request with the access token from the authenticator; and providing, by the interceptor hub application, the new client with access to the second application program interface/endpoint responsive to the authenticating by the interceptor hub application.

18. The non-transitory computer-readable medium of claim 15, wherein when the instructions are executed by the processor of the first computing device, the first computing device is further configured to perform:

providing, by the interceptor hub application, an application program interface owner service to determine who owns an application program interface, the application program interface owner service providing an owner of the application program interface an ability to manage the application program interface.

19. The non-transitory computer-readable medium of claim 15, wherein when the instructions are executed by the processor of the first computing device, the first computing device is further configured to perform:

providing a user management service to manage access by a user within the user interface; and providing a user service to provide authorizations and permissions of the user within the user interface.

20. The non-transitory computer-readable medium of claim 15, wherein when the instructions are executed by the processor of the first computing device, the first computing device is further configured to perform:

controlling a plurality of components of the user interface for a user based on a role assigned to the user from a plurality of roles, the plurality of roles including an interceptor hub system admin role; application program interface roles, and event stream processing roles, wherein:

the application program interface roles and the event streaming and processing roles each include a respective admin role, a respective manager role, and a respective user role.

* * * * *